(12) United States Patent
Gladish et al.

(10) Patent No.: US 10,793,983 B2
(45) Date of Patent: Oct. 6, 2020

(54) FOOTWEAR AND OTHER ARTICLES FORMED BY JET EXTRUSION PROCESSES

(71) Applicant: The North Face Apparel Corp., Wilmington, DE (US)

(72) Inventors: Justin Lee Gladish, Oakland, CA (US); Mary-Ellen Smith, San Francisco, CA (US); Mark William McMillan, Beaverton, OR (US); William Cass, Rockford, MI (US)

(73) Assignee: The North Face Apparel Corp., Wilmington, DE (US)

( * ) Notice: Subject to any disclaimer, the term of this patent is extended or adjusted under 35 U.S.C. 154(b) by 441 days.

(21) Appl. No.: 15/523,635

(22) PCT Filed: Nov. 9, 2015

(86) PCT No.: PCT/US2015/059720
§ 371 (c)(1),
(2) Date: May 1, 2017

(87) PCT Pub. No.: WO2016/077221
PCT Pub. Date: May 19, 2016

(65) Prior Publication Data
US 2017/0306539 A1    Oct. 26, 2017

Related U.S. Application Data

(60) Provisional application No. 62/077,716, filed on Nov. 10, 2014.

(51) Int. Cl.
*D04H 3/07*    (2012.01)
*A41D 31/02*    (2019.01)
(Continued)

(52) U.S. Cl.
CPC ............. *D04H 3/07* (2013.01); *A41D 31/02* (2013.01); *A43B 13/181* (2013.01);
(Continued)

(58) Field of Classification Search
CPC .... A41D 2500/30; A41D 31/02; A43B 13/04; A43B 13/12; A43B 13/181;
(Continued)

(56) References Cited

U.S. PATENT DOCUMENTS 4,440,377 A    4/1984 Hujik
2001/0024709 A1    9/2001 Yoneda et al.
(Continued)

FOREIGN PATENT DOCUMENTS

CN    101801229    8/2010
CN    101820788    9/2010
(Continued)

OTHER PUBLICATIONS

International Search Report and Written Opinion for PCT Application No. PCT/US2015/059720, dated Mar. 1, 2016, 20 pages.
(Continued)

*Primary Examiner* — Yan Lan
(74) *Attorney, Agent, or Firm* — Smith, Gambrell & Russell LLP

(57) ABSTRACT

In certain aspects, the inventive subject matter is directed to production of constructs of footwear and components thereof by jet extrusion. The inventive subject matter contemplates novel processes for making such constructs using jets or streams of materials that solidify as fibers, and which form into two- or three-dimensional webs as they are collected. The webs may be in the nature of films, membranes, or mats. In some embodiments, the inventive subject matter generally relates to nonwoven textiles consisting of
(Continued)

webs of superfine fibers, i.e., fibers with diameters in nanoscale or micronscale ranges.

13 Claims, 13 Drawing Sheets

(51) Int. Cl.
| | |
|---|---|
| *D01D 5/26* | (2006.01) |
| *D01D 4/02* | (2006.01) |
| *A43B 13/04* | (2006.01) |
| *B29D 35/12* | (2010.01) |
| *A43D 3/02* | (2006.01) |
| *D04H 1/76* | (2012.01) |
| *A43D 8/10* | (2006.01) |
| *A43B 23/02* | (2006.01) |
| *A43B 13/18* | (2006.01) |
| *B29D 35/00* | (2010.01) |
| *D01D 7/00* | (2006.01) |
| *B29D 35/04* | (2010.01) |
| *B29D 35/14* | (2010.01) |
| *A43B 23/26* | (2006.01) |
| *B29D 35/08* | (2010.01) |
| *A43B 7/12* | (2006.01) |
| *A43B 13/12* | (2006.01) |
| *B29K 105/08* | (2006.01) |

(52) U.S. Cl.
CPC ........ *A43B 23/026* (2013.01); *A43B 23/0225* (2013.01); *A43B 23/0245* (2013.01); *A43D 3/02* (2013.01); *A43D 8/10* (2013.01); *B29D 35/0018* (2013.01); *B29D 35/122* (2013.01); *D01D 4/02* (2013.01); *D01D 5/26* (2013.01); *D01D 7/00* (2013.01); *D04H 1/76* (2013.01); *A41D 2500/30* (2013.01); *A43B 7/125* (2013.01); *A43B 13/04* (2013.01); *A43B 13/12* (2013.01); *A43B 23/022* (2013.01); *A43B 23/024* (2013.01); *A43B 23/027* (2013.01); *A43B 23/0215* (2013.01); *A43B 23/0235* (2013.01); *A43B 23/26* (2013.01); *B29D 35/04* (2013.01); *B29D 35/08* (2013.01); *B29D 35/12* (2013.01); *B29D 35/14* (2013.01); *B29K 2105/0854* (2013.01); *B29K 2995/0065* (2013.01); *B29K 2995/0069* (2013.01)

(58) Field of Classification Search
CPC .............. A43B 23/0215; A43B 23/022; A43B 23/0225; A43B 23/0235; A43B 23/024; A43B 23/0245; A43B 23/026; A43B 23/027; A43B 23/26; A43B 7/125; A43D 3/02; A43D 8/10; B29D 35/0018; B29D 35/04; B29D 35/08; B29D 35/12; B29D 35/122; B29D 35/14; B29K 2105/0854; B29K 2995/0065; B29K 2995/0069; D04H 1/76; D04H 3/07; D01D 4/02; D01D 5/26; D01D 7/00

See application file for complete search history.

(56) References Cited

U.S. PATENT DOCUMENTS

| | | |
|---|---|---|
| 2005/0116379 A1 | 6/2005 | Goldsmith et al. |
| 2006/0276095 A1 | 12/2006 | Dua et al. |
| 2008/0315466 A1 | 12/2008 | Hood et al. |
| 2009/0140470 A1 | 6/2009 | Dua et al. |
| 2010/0186874 A1 | 7/2010 | Sussman |
| 2010/0199520 A1* | 8/2010 | Dua .................. A43B 1/04 36/87 |
| 2011/0062626 A1 | 3/2011 | Kuehl |
| 2011/0154584 A1 | 6/2011 | Ungari et al. |
| 2012/0025410 A1 | 2/2012 | Chang et al. |
| 2012/0055044 A1 | 3/2012 | Dojan et al. |
| 2014/0182170 A1 | 7/2014 | Wawrousek et al. |
| 2015/0003170 A1 | 1/2015 | Kim et al. |

FOREIGN PATENT DOCUMENTS

| | | |
|---|---|---|
| CN | 102125330 | 7/2011 |
| CN | 103747701 | 4/2014 |
| CN | 107208335 A | 9/2017 |
| CN | 110215015 A | 9/2019 |
| EP | 3218537 A1 | 9/2017 |
| HK | 1244519 | 3/2020 |
| TW | 201629290 A | 8/2016 |
| WO | 2015003170 | 1/2015 |
| WO | 2016/077221 A1 | 5/2016 |

OTHER PUBLICATIONS

Office Action with English Machine Translation in Chinese Application No. 2015800726707, dated Oct. 23, 2018, 11 pages.
Office Action in Taiwan Application No. 104136980, dated Mar. 17, 2017, 11 pages.
International Preliminary Report on Patentability for PCT Applicaiton No. PCT/US2015/059720, dated May 16, 2017, 12 pages.
Extended European Search Results in European Application No. 15820916, 11 pages, dated Feb. 22, 2019.

* cited by examiner

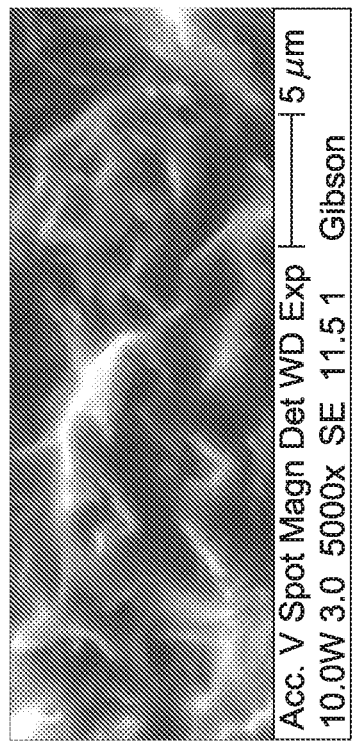
FIG. 1A
(Prior Art)
(a) eVent ePTFE film
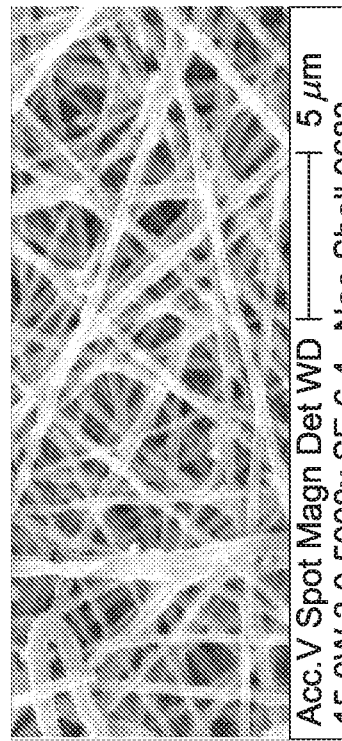
FIG. 1B
(Prior Art)
(b) Gore-Tex Membrane (coated side: continuous polymer film)
FIG. 1C
(Prior Art)
(c) Gore-Tex Membrane (uncoated Side: ePTFE)
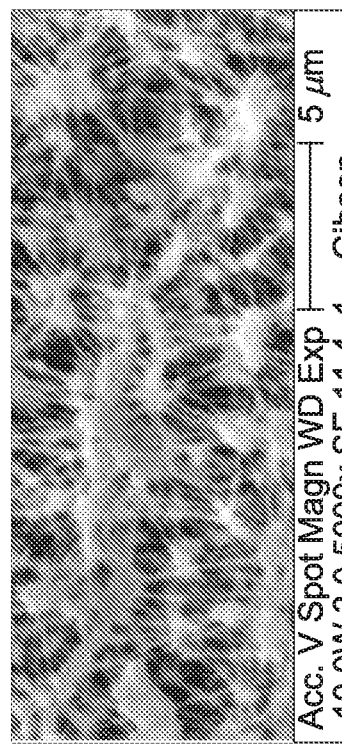
FIG. 1D
(Prior Art)
(d) NeoShell Electrospun Polyurethane Membrane

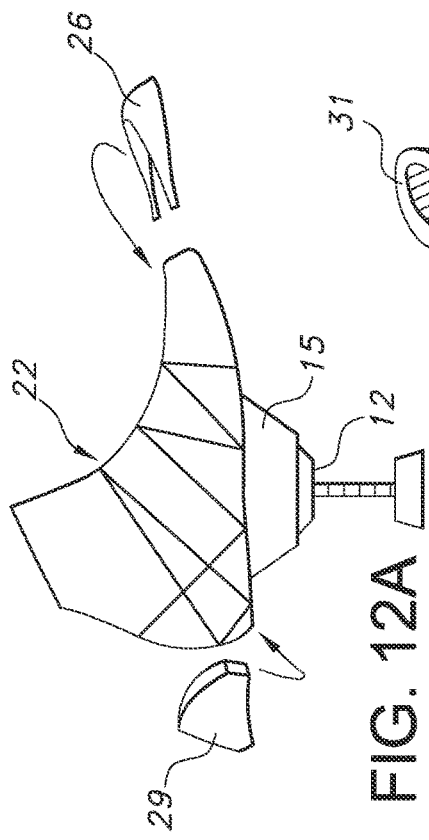
FIG. 12A
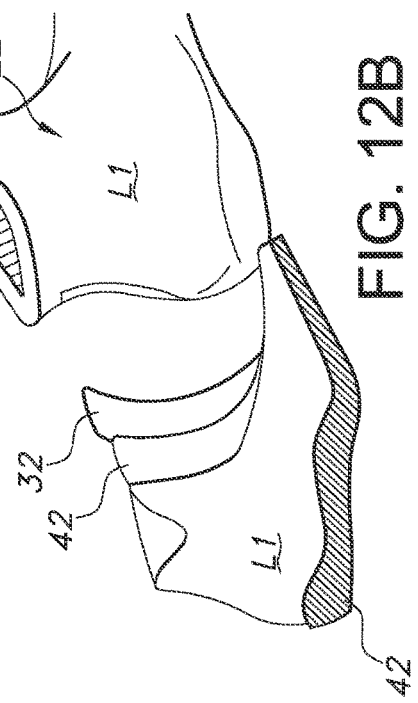
FIG. 12B
FIG. 12C
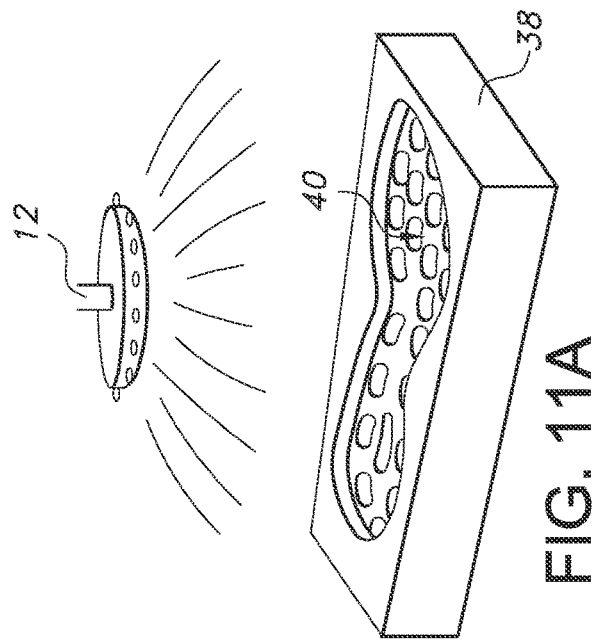
FIG. 11A
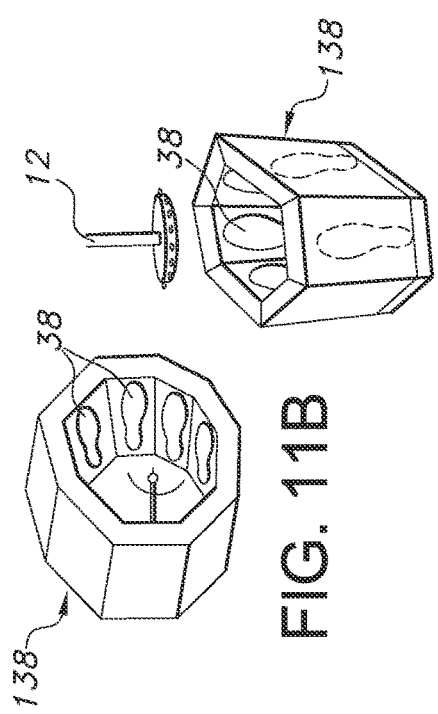
FIG. 11B
FIG. 11C

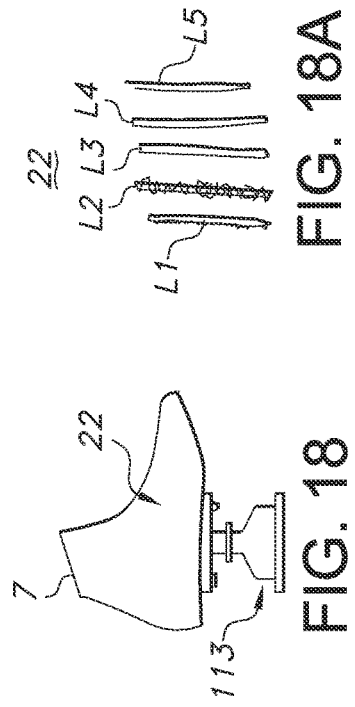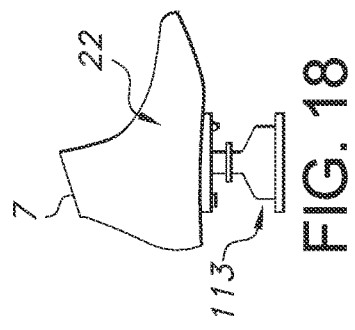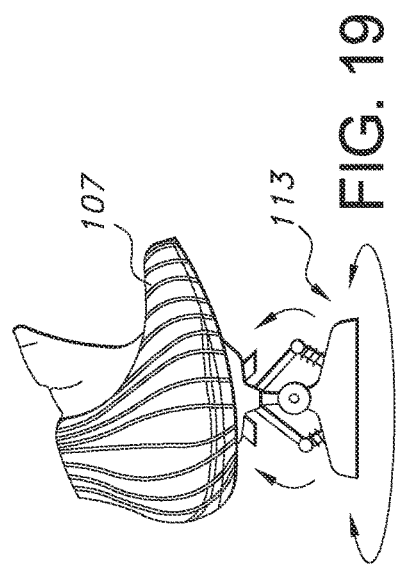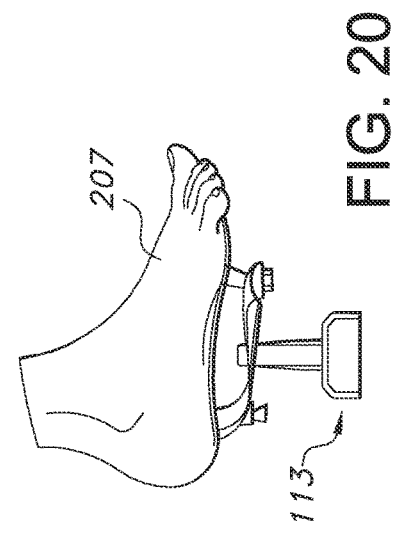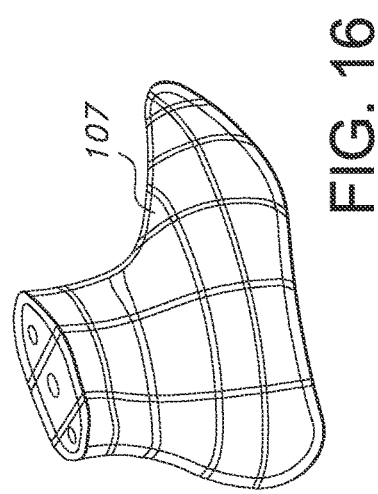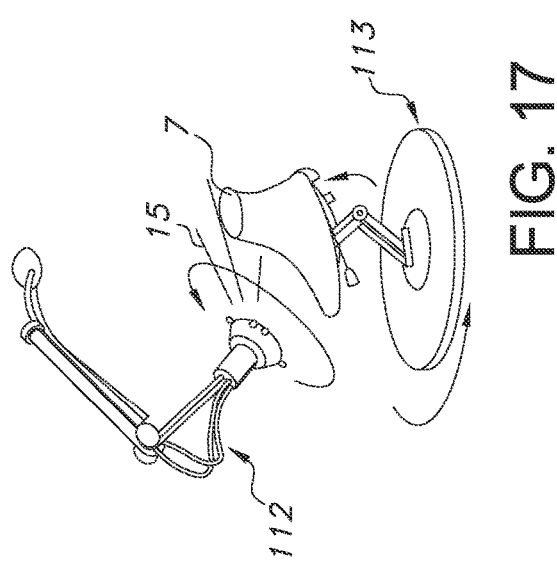

FOOTWEAR AND OTHER ARTICLES FORMED BY JET EXTRUSION PROCESSES

RELATED APPLICATIONS

This application claims the benefit of and priority to U.S. Provisional Application Ser. No. 62/077,716, filed Nov. 10, 2014, the contents of which are hereby incorporated by reference as if recited in full herein for all purposes.

BACKGROUND

The inventive subject matter disclosed herein generally relates to fiber products, such as nonwoven textiles and insulative materials consisting of webs of fibers that are formed by forced ejection of fluid polymer material onto a substrate that collects the fibers. The fibers may be superfine fibers, i.e., fibers with diameters in nanoscale or micronscale ranges, for use in articles of apparel, footwear, and outdoor equipment.

The inventive subject matter particularly relates to 3D, i.e., non-linear or planar articles having significant dimensions along X, Y, and Z axes whose surfaces are defined by the topology of a web of fibers.

Prior art techniques for forming 3D apparel (including gloves and headwear) footwear and equipment (e.g., backpacks and other carriers or luggage items) are labor intensive and inefficient. The process of weaving or knitting textiles for mass commercial production involves expensive and complicated machines. The sheets of textile materials that come off the machines typically are subject to various processing steps, including cutting, sewing, bonding, molding, etc. along the way to becoming 3D finished products.

In becoming finished products such as footwear, the textile materials must be assembled with other components that come from separate productions processes. The joining of different materials can create issues, including the possibility of joints that are weak or vulnerable to failure. The inclusion of seams and joints can also detrimentally impact the aesthetics of products.

In view of the foregoing disadvantages in the prior art, there is a substantial need for improved products and processes.

SUMMARY

The inventive subject matter disclosed herein overcomes the foregoing and other disadvantages in the prior art. In certain aspects, the inventive subject matter is directed to production of constructs of articles, such as footwear and components thereof, by jet extrusion. The inventive subject matter contemplates making such constructs using jets or streams of materials that solidify as fibers, and which form into two- or three-dimensional webs as they are collected. The webs may be in the nature of films, membranes, or mats.

In some embodiments, the inventive subject matter generally relates to nonwoven textiles consisting of webs of superfine fibers, i.e., fibers with diameters in nanoscale or micronscale ranges, and two- or three-dimensional constructs formed of such textiles. The inventive subject matter is also directed to related apparatus and post-web formation processing into end products.

These and other embodiments are described in more detail in the following detailed descriptions and the Figures.

The foregoing is not intended to be an exhaustive list of embodiments and features of the inventive subject matter. Persons skilled in the art are capable of appreciating other embodiments and features from the following detailed description in conjunction with the drawings. The appended claims, as originally filed in this document, or as subsequently amended, are hereby incorporated into this Summary section as if written directly in.

BRIEF DESCRIPTION OF THE DRAWINGS

The following Figures show embodiments according to the inventive subject matter, unless noted as showing prior art.

FIGS. 1A-1D show scanning electronic microscope images and associated microscopy and materials details for several known microporous membranes.

FIGS. 11A-11C schematically illustrate a mold and an array of molds for forming a sole unit by jet extrusion of material into the mold or molds shown.

FIGS. 12A-12C schematically illustrate system a setup for forming a sole unit, particularly a sock liner, by jet extrusion of material into the bottom of an upper and certain possible steps for finishing the upper.

FIG. 16 schematically illustrates an adjustable last that may be used in jet extrusion processes disclosed herein.

FIG. 17 schematically illustrates a system for multi-axis movement that may be used in jet extrusion processes disclosed herein.

FIG. 18 schematically illustrates a system for multi-axis movement that may be used in jet extrusion processes disclosed herein.

FIG. 18A shows an exploded view of certain layers of material that may be formed on last using a multi-axis or other jet extrusion systems disclosed herein.

FIG. 19 schematically illustrates a system for multi-axis movement that may be used in jet extrusion processes disclosed herein, in this case the system is setup with an adjustable size last.

FIG. 20 schematically illustrates a system that may be used in jet extrusion processes disclosed herein for the customization of footwear to a specific user.

DETAILED DESCRIPTION

Figure 2:
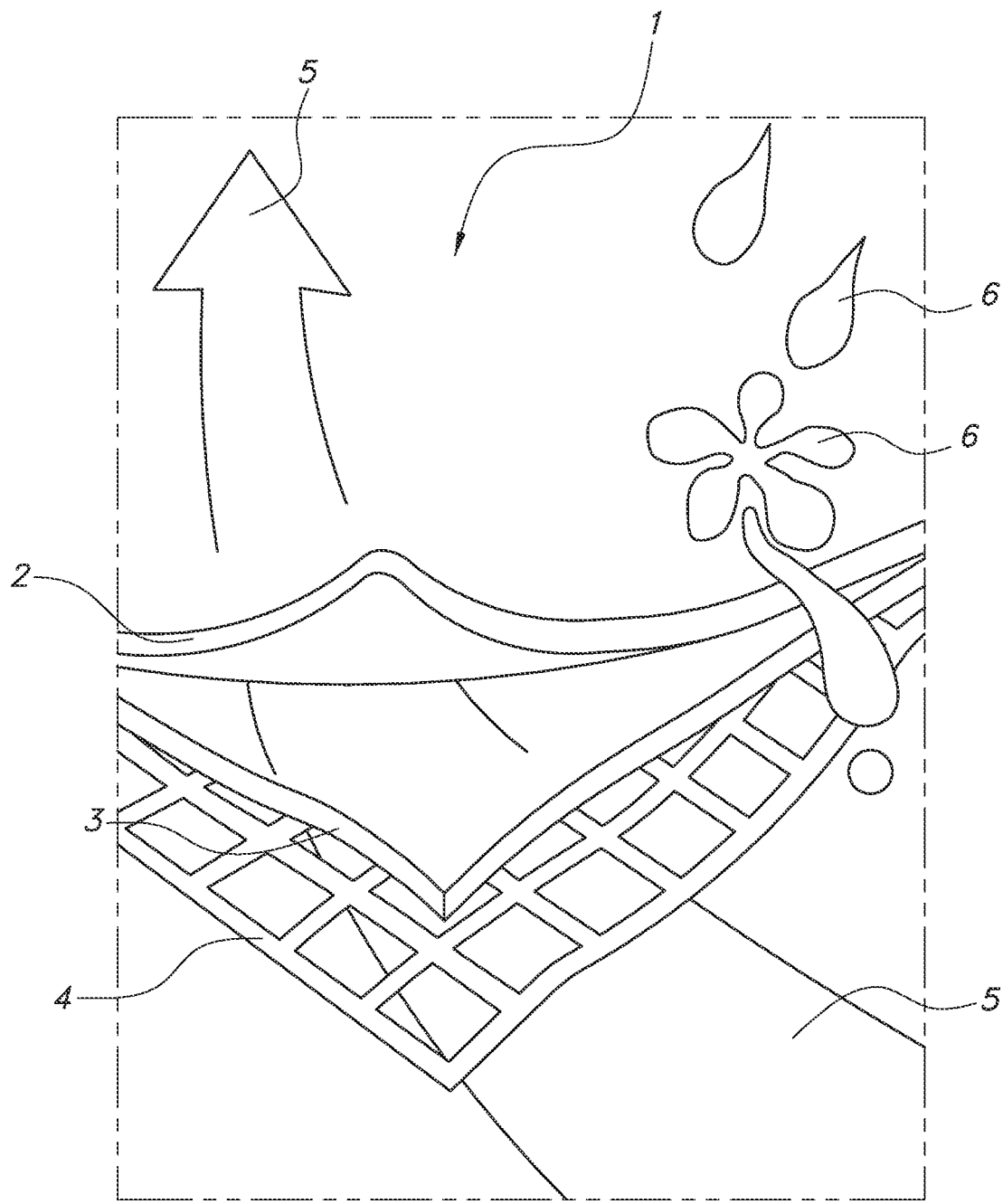
FIG. 2 schematically illustrates a composite construct that may include a layer of waterproof-breathable material produced according to the inventive subject matter.

Representative embodiments according to the inventive subject matter are shown in FIGS. 2-22, wherein the same or generally similar features may share common reference numerals.

The inventive subject matter generally relates to fibers formed into two- or three-dimensional webs, i.e., mats, films or membranes. The fibers may be produced using forced ejection of a selected starting fiber-forming, fluid material through an outlet port. The outlet port, e.g., a nozzle, is configured with a size and shape to cause a fine jet of the fluid material to form on exit from the outlet port. As used herein, an outlet port means an exit orifice plus any associated channel or passage feeding the outlet port and serving to define the nature of the expelled jet of fiber-forming material. Due to factors such as surface tension, fluid viscosity, solvent volatility, rotational speed, and others, the ejected material can solidify as a fiber that may have a diameter that is significantly less than the inner diameter of the outlet port. Herein, such expulsion of flowable material from an outlet port as a jet that solidifies as a fiber may be referred to as "jet extrusion".

The jet of expelled material is directed to a collector, i.e., any targeted substrate, where it is gathered for use in an end product or as the end product or an intermediate to an end product. The collected fiber material forms a web of two- or three-dimensional entangled fibers that can be worked to a desired surface area and thickness, depending on the amount of time fibers continue to be expelled onto a collector, and control over the surface area of the collector (e.g., a moving belt as a collector can allow for sheets of material of unlimited length). Other properties, such as web density and porosity will depend on such factors as the nature of the fibers, processing temperatures, speed and path of jets, etc. The working of the web to a desired thickness, surface area, density, and/or porosity may also include post-processing steps, such as compression of the collected webs, thermal processing for densification or expansion (depending on nature of fibers), chemical processing, and processing with electromagnetic radiation (e.g., UV wavelengths to induce cross-linking).

In certain embodiments, a rotary device imparts centrifugal force on a fiber-forming material to cause jet extrusion and consequently fiber formation. The force that is imparted on the source material may come from various systems and techniques that may or may not require applied electrical fields, as in electrospinning. For example, U.S. Pat. Nos. 4,937,020, 5,114,631, 6,824,372, 7,655,175, 7,857,608, 8,231,378, 8,425,810, and US Publication No. 20120135448, teach various devices and processes for forced ejection of fiber-forming material through an outlet port on a rotary device. The foregoing collection of patent documents includes disclosures for systems for production of fibers with average diameters in the micron-scale or nanoscale range. The foregoing patent documents are hereby incorporated in their entireties for all purposes. An alternative approach to rotary systems is based on non-rotary pressure feeding of a fiber-forming fluid through an outlet port that creates a jet of the fluid that forms into a fiber. For example, U.S. Pat. No. 6,824,372, which is hereby incorporated by reference in its entirety for all purposes, discloses a chamber that imparts ejection force on a fiber-forming fluid contained therein via oscillating pressure changes that are generated by a movable wall for the chamber.

In some embodiments, the inventive subject matter relates to compositions of nonwoven, fibrous films or membranes based on superfine fibers for use in construction of articles that have a predetermined degree of waterproofness, windproofness and breathability. The inventive subject matter is directed in part to production of such articles and components of the articles, using novel processes. As used herein, superfine fibers means fibers having an average diameter (or other major cross-sectional dimension in the case of non-circular fibers) in the micron scale to nanoscale. As used herein, "micron scale" means the fibers have average diameters in the range of single-digit microns to as low as about 1000 nanometers. In the textile industry, nanoscale fibers have average diameters in the range of about 100-1000 nanometers or less). In certain embodiments, superfine fibers exhibit a high aspect ratio (length/diameter) of at least 100 or higher. Superfine fibers may be analyzed via any means known to those of skill in the art. For example, Scanning Electron Microscopy (SEM) may be used to measure dimensions of a given fiber.

Notably, none of the foregoing patent documents teach the production of waterproof, breathable materials and products made from the disclosed apparatuses or processes.

The inventive subject matter is particularly directed to certain articles incorporating superfine fibers created by jet extrusion, the articles consisting of garments and apparel, e.g., jackets and pants; footwear, e.g., shoes and socks; headwear, e.g., soft caps and brimmed or visored hats, and facemasks; outdoor equipment, e.g., sleeping bags and shells for sleeping bags, blankets, tents, tarps and other covers; and luggage and packs, e.g., soft-sided bags, backpacks, waist packs, suitcases, duffel bags, bike messenger bags and other bags for bikers, briefcases, etc. FIG. 2 shows an example of a possible assembly of layers used to form a composite structure 1 for use in end products, such as those mentioned above. The assembly includes an upper first layer 2 that is positioned above a second or intermediate layer 3. The intermediate layer is positioned above a third lower layer 4. In any of the layers, the layer may be a continuous layer of material or a discontinuous layer. In discontinuous layers, the layers can be characterized as interconnected materials with voids, openings, channels, etc., or they can be characterized as disconnected materials, such as an array of dots. For example, the lower layer 3 in FIG. 2 is seen as an interconnected web of material with square-shaped voids. That layer may represent a discrete sheet of such material or a pattern applied by a deposition technique such as screen printing.

In some waterproof-breathable applications for outerwear known as "3L" construction or composite, the first layer 2 is an outer layer that consists of a hard shell material. Example materials include nylon, polyester, and wool. Layer 2 or other layers may be a woven fabric, a nonwoven fabric, or a knit fabric. Layer 3 is a microporous membrane made of PTFE or polyurethane, for example. Layer 4 is a liner layer made of a textile formed of synthetic or natural fibers, or blends. Example materials include nylon, polyester, and wool. Layer 4 may be a woven fabric, a nonwoven fabric, or a knit fabric. In this example, the microporous membrane is a waterproof, breathable membrane that allows water vapor 5 to pass through but blocks liquid phase water 6.

As indicated above, layer 3 may be created using any forcespinning or other jet extrusion technique described herein. Layers 3 or 4 may be a substrate onto which the layer 3 material is collected during such technique. A third layer may be added in an inline process.

Where layer 3 in a three-layer construction is a discontinuous layer or a thinly deposited film layer, e.g., a screen-printed layer, the assembly may be referred to as a "2.5L" composite. If the composite is based on just a laminated construction of the intermediate layer 3 and an outer or inner layer, the construction may be referred to as a "2L" composite. It should be understood that the foregoing forms of composite constructions are typical for outerwear. However, any number of other layers may be included in a composite assembly.

Persons skilled in the art will appreciate that the foregoing principles of multilayer construction may apply to any multilayer product. For example, footwear often has a multilayer construction. The different layers may all be formed using the jet extrusion techniques disclosed herein. For example, the layers may be sequentially formed in the same jet extrusion apparatus by selectively apply different materials from the same or different outlet ports.

Alternatively, one or more layers may be discretely formed in separate processes and systems. Discrete layers in a composite assembly may be bound together using any of various known or to be discovered means, including known means such as thermal (fusion) bonding, ultrasonic welding, chemical bonding (direct bonding of layer material to layer material, or through intermediate adhesives), and stitching and other forms of mechanical fastening.

In certain embodiments, a web of jet-extruded fiber is formed directly on a substrate that is a component of an end product, e.g., a layer of material for an item of footwear, jacket, or a glove. This concept is discussed in more detail below.

In certain embodiments, the substrate onto which fibers are collected is a volumetric mold (positive or negative), i.e., a substrate that imparts a desired three-dimensional shape for use as or in an end product or a component thereof. The mold may comprise or include other components of the end product. The fibers may be collected on the other components associated with the mold. Or, they may be substantially isolated from other components.

Figure 4A:
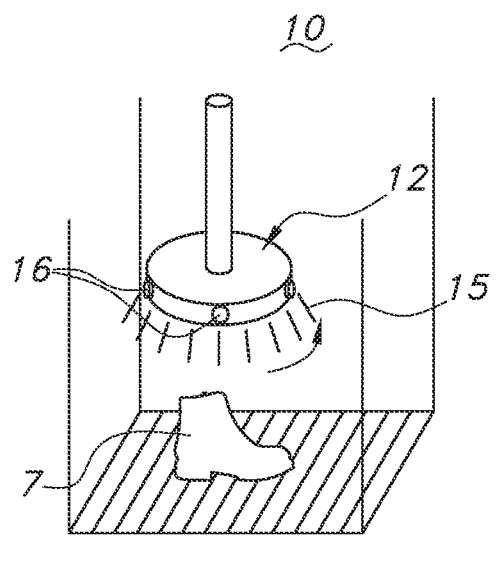
FIGS. 4A-4B schematically illustrate the use of molds in connection with a force spinning system or other jet extrusion system.
Figure 4B:
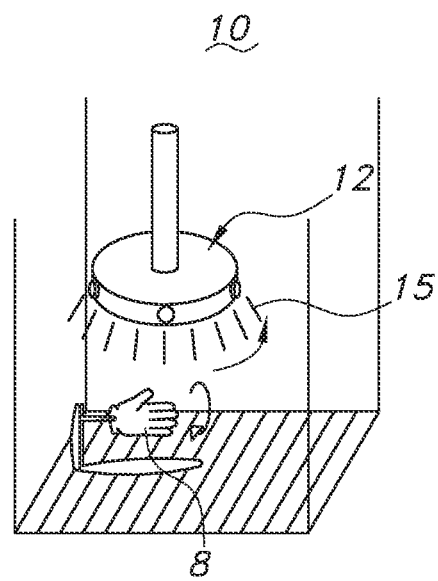

For example, the mold may be a last 7 or other form for a shoe 8. (FIGS. 4A-4B.) The mold onto which fibers are collected may be bare or it may have a layer of a material that represents an inner liner of a shoe, which becomes bonded or otherwise assembled to the overlaid fiber network. The last may have a sole unit, e.g., an outsole, midsole, and/or sockliner, associated with a bottom surface of the last, which bottom surface is oriented on the surface of tray or other support such that the sole unit is generally isolated from and does not collect fibers. However, in some applications, a portion of a sole unit may be intended for collection of fibers. For example, a peripheral edge may be exposed to fibers, allowing fibers to collect for direct bonding to the exposed edge to form an integral assembly of the sole unit with the upper for the shoe. The mold may be static or rotated during the collection process.

In other examples, the mold may be configured as a garment or item of apparel, for instance, a jacket shell, pants, or part thereof, e.g. a sleeve or pant leg; a hat; an item of outdoor equipment. FIG. 4B shows a mold or form for a glove in a force-spinning system. From the foregoing, it can be understood that the inventive subject matter allows for the formation of membranes or films composed of superfine fibers that have a three-dimensional configuration and seamlessness over the molded configuration. In some but not necessarily all embodiments, superfine fibers, including ones at the nanoscale, are formed into a 3D membrane or film that is a waterproof, windproof, and/or breathable layer according to outerwear industry standards.

As indicated above, use of rotary forces to eject a flowable, fiber-forming material as a jet or stream from an outlet port is particularly suitable for use in the inventive subject matter. Such a technique may be referred to hereinafter as "forcespinning".

In contrast to the prior art, forcespinning uses a small amount of electricity, and produces much longer fibers (up to 1 meter or more). Longer fibers allow for stronger and more durable webs. Forcespinning also allows for a highly consistent and controlled deposition of nanofibers of the same diameter, and it may not require any water, and may not involve generation of toxic chemical vapors. The forcespinning process has relatively very little waste. It is also adaptable for use with a wide range of fiber-forming materials.

Webforming/Forcespinning Process Overview:

The processes and equipment for forcespinning are known to persons skilled in the art by virtue of various known teachings, such as some of the patent documents listed above, as well by virtue of commercial equipment suppliers such as FibeRio Technology Corporation, McAllen, Tex., USA, which supplies a line of forcespinning equipment (See http://fiberiotech.com/products/forcespinning-products/). Therefore, a detailed description of forcespinning is unnecessary, and only is a brief description will be provided herein.

Forcespinning is a process to extrude super fine fibers using centrifugal force to elongate the fibers. This creates cohesive, nonwoven mats of fiber networks. Fiber crossings generate contact points. This creates inter-fiber porosity, and, in the case of relatively long fibers, intra-fiber porosity, as well. Fiber contacts and fiber morphology influence the size of the pores. Because of the network structure, these pores exist in multiple planes (vertically, horizontally, and diagonally).

In electrospinning, the surface area of electrospun membranes increases with increased fiber diameter. In electrospun membranes, pore sizes as small of 500 nm have been recorded. Water vapor molecules are approximately 0.4 nm, and water molecules (liquid) are approximately 500,000 nm. This allows vapor to pass through electrospun membranes but not water in the liquid form. The same fiber diameters and porosity is attainable with forcespinning techniques. Therefore, this similarity provides large diversity to fiber morphologies and fiber diameters that can be adapted from electrospinning, but avoiding the disadvantages or electrospinning technologies. Furthermore, forcespinning is believed capable of creating fibers that can be three or more times the length of corresponding electrospun fibers. This difference allows for more durability in finished articles.

Figure 3:
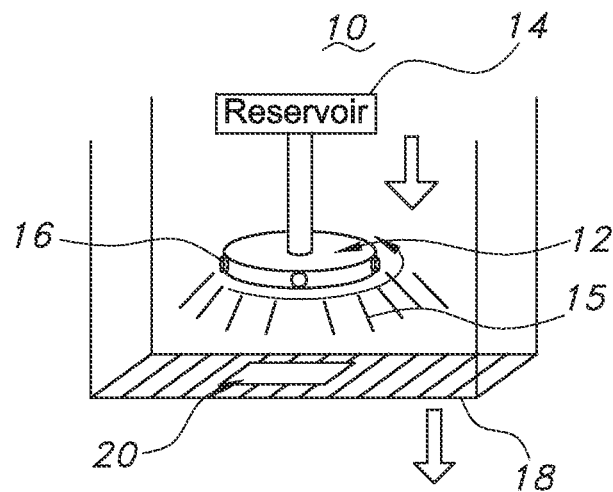
FIG. 3 schematically illustrates a force spinning system for use in producing constructs according to the inventive subject matter.

Referring to FIGS. 3-4B, a force-spinning system 10 is shown for producing superfine fibers and collecting them into a cohesive web, such as a film or mat. The system includes a spinneret 12 that is fluidly coupled to a source of fluid or flowable material that is formable into a fiber ('fiber-forming material'). The source of material may be a reservoir 14 for continuously feeding the spinneret. The spinneret could itself include a reservoir of material that is rotated with the spinneret.

The flowable material could be molten material or a solution of material. The spinneret is mechanically coupled to a motor (not shown) that rotates the spinneret in a circular motion. In certain embodiments, the rotating element is rotated within a range of about 500 to about 100,000 RPM. In certain embodiments, the rotation during which material is ejected is at least 5,000 RPM. In other embodiments, it is at least 10,000 RPM. In other embodiments, it is at least 25,000 RPM. In other embodiments, it is at least 50,000 RPM. During rotation, a selected material, for example a polymer melt or polymer solution, is ejected as a jet of material 15 from one or more outlet ports 16 on the spinneret into the surrounding atmosphere. The outward radial centrifugal force stretches the polymer jet as it is projected away from the outlet port, and the jet travels in a curled trajectory due to rotation-dependent inertia. Stretching of the extruded polymer jet is believed to be important in reducing jet diameter over the distance from the nozzle to a collector. The ejected material is expected to solidify into a superfine fiber by the time it reaches a collector. The system includes a collector 18 for collecting the fiber in a desired manner. For example, the fibers could be ejected from the spinneret onto a surface disposed below the spinneret or on a wall across from outlet ports on the spinneret. The collecting surface could be static or movable. To form a sheet or mat 20 of fibrous material, the surface could be a flat surface. The flat surface could be static or movable.

A movable flat surface could be part of a continuous belt system that feeds the fibrous material into rolls or into other processing systems. Another processing system could be an in-line lamination or material deposition system for laminating or depositing other materials onto sheet material produced using the force-spinning system or other system for producing sheeted material of superfine fibers. In other embodiments, the flat surface could support a layer of another material onto which the fibers are deposited. For example, the layer of materials onto which fibers are deposited could be an inner or outer layer for a composite assembly of layers for an end product, such as an item of apparel.

In certain embodiments, the collecting surface is a 3D object such as a mold or 3D component of an end product. FIGS. 4A-4B show examples of 3D objects 7, 8 for end products that are shoes or gloves.

To direct fibers to a desired collecting surface (a "collector"), a fiber-directing system may be made a part of the force-spinning system. For example, the directional system may be configured to provide air from above and/or vacuum from below the desired collector to direct the fibers to the collector.

As the superfine fibers are laid upon each other, contacts points are made at intersections, and the fiber constituents bind together in a web or other desired form of intersecting or entangled fibers. If any web-bonding of the contact points is desired, it may be accomplished via application of heat (thermal bonding), heat and pressure, and/or chemical bonding. The force-spinning system may include heating elements, pressure applicators, and chemical bonding units for achieving such bonding.

Under the inventive subject matter, forcespinning may be further applied to the deposition of multiple layers of fibers using combinations of spinneret orifice sizes, orifice geometries, and configurations. For example, fibers can be made into circles, uncollapsed circle (i.e., basically a circular fiber, hollow in the center, that is compressed into an ellipse), or flat ribbons.

Additionally, different spinnerets can be included in a force-spinning system, resulting in different fiber diameters or blends. For example, multiple spinnerets in a system can create fiber blends during the spinning. Spinnerets can also be configured with outlet ports that can create a core-sheath structure. Alternatively, a single spinneret with multiple outlet ports, each coupled to a reservoir of a different flowable, fiber-forming material can create blends.

Similarly, fiber properties can be controlled by providing on the rotary device different outlet ports of varying selected diameters. The inventive subject matter contemplates a range of outlet port diameters from between about 1 to about 1000 micrometers. Larger diameters are also contemplated if relatively high diameter fibers are desired. Channels or passages leading to outlet ports typically would have straight runs. They may be as long as 1-3 millimeters.

In a given system, the diameters and/or shapes or dimensions of the outlet ports may be uniform or they may be varied. In some embodiments, the outlet ports are formed as nozzles of a predetermined length that have decreasing taper toward the port. Outlet ports and associated passages or channels may be formed using known micromilling techniques, or to be discovered techniques. Known techniques include mechanical millings, chemical etching, laser drilling, and ablation.

In addition to superfine fibers, forcespinning systems according to the inventive subject matter may be used to create fibers of standard textile size (e.g., 50-150 denier).

These superfine or other fibers may include functional particles such as, but not limited to, antimicrobials, metals, flame-retardants, and ceramics. These materials may be introduced into the spinneret along with the fiber-forming material. They may bond to the material covalently, by hydrogen bonds, ionic bonds or van der Waals forces, for example. A catalyst may be included in the material mixture to facilitate any such bonding.

In any case, for the above-mentioned end products, the fiber mats (ranging from different fiber sizes, materials, or blends) can be layered together to create whole garment composites, or in the case of 3D objects, whole end products, e.g., shoe composites and gloves. The collected fibers can be carded for spinning into yarn. The yarn may be used in, for example, apparel, footwear, and equipment end products, to take advantage of the unique properties that may be exhibited by nanoscale fibers. The fiber-forming materials can be chosen by melt temperatures to provide different structural rigidity in the final end product when heat cured after forcespinning. This may be especially important for 3D structures such as gloves and shoe uppers, which require relatively more durability than other end products, such as outerwear.

The inventive subject matter contemplates use of forcespinning to create nanofiber membranes for use in 2L, 2.5L, and 3L waterproof/breathable products. After membranes are spun, they may, or may not, be coated with a protective film to protect the pores from contamination. Depending on membrane end use, the fibers may optionally be extruded with an oleophobic component to protect the membrane from contamination of dirt and oils, or a similar oleophobic coating can be applied after the membrane is spun. Coating with an oleophobic coating will not cover the pores in the membrane or adversely affect the breathability or air permeability, but will still modify the nanofiber surface as to not attract dirt and oil and hence prevent contamination. The membranes may be directly spun onto the chosen face fabric of the final material, or the membranes may be spun onto contact paper and then laminated onto the chosen face fabric of the final material. The membrane, either deposited directly on the fabric, or material, or laminated on the material, may also be used in softshell constructions. The diameter of the nanofiber affects pore size of the membrane. The cross-sectional morphology of the fibers and fiber thickness affect the surface area of the fibers. Increasing the surface area of the fibers can reduce the pore size. Reducing the fiber diameter is a way to increase surface area/volume ratio. Therefore, fiber diameter is a way to control thickness, durability, and moisture vapor transfer. Thickness affects weight of the membrane. Collectively, these factors influence the breathability and durability of the nanofiber membrane. Nanofiber diameters according to the inventive subject matter can be anywhere in the nanoscale range. A suitable range for applications described herein is believed to be about 100 nm to about 1000 nm. Pore size influences air permeability. Therefore, the air permeability for a membrane may be controlled for most applications using nanofibers in the foregoing size range. Fiber-forming materials of use for softshell and waterproof breathable applications include PFTE dispersions, polyurethanes, nylons, polyesters, bio-based materials, e.g., such cellulosic materials, silk proteins, and other fiber-forming materials that are to be discovered, including other polymers derived from natural and synthetic sources.

In certain embodiments of the inventive subject matter, the flowable, fiber-forming material may be a mixture of two or more polymers and/or two or more copolymers. In other embodiments, the fiber-forming material polymers may be a mixture of one or more polymers and or more copolymers. In other embodiments, the fiber-forming material may be a mixture of one or more synthetic polymers and one or more naturally occurring polymers.

In some embodiments according to the inventive subject matter, the fiber-forming material is fed into a reservoir as a polymer solution, i.e., a polymer dissolved in an appropriate solution. In this embodiment, the methods may further comprise dissolving the polymer in a solvent prior to feeding the polymer into the reservoir. In other embodiments, the polymer is fed into the reservoir as a polymer melt. In such embodiment, the reservoir is heated at a temperature suitable for melting the polymer, e.g., is heated at a temperature of about 100° C. to about 300° C.

In some embodiments according to the inventive subject matter, a plurality of micron, submicron or nanometer dimension polymeric fibers are formed. The plurality of micron, submicron or nanometer dimension polymeric fibers may be of the same diameter or of different diameters.

In some embodiments according to the inventive subject matter, the methods of the invention result in the fabrication of micron, submicron or nanometer dimensions. For example, it is believed possible to fabricate polymeric fibers having diameters (or similar cross-sectional dimension for non-circular shapes) of about 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000 nanometers, or 2, 5, 10, 20, 30, 40, or about 50 micrometers. Sizes and ranges intermediate to the recited diameters are also part of the inventive subject matter.

The polymeric fibers formed using the methods and devices of the invention may be of a range of lengths based on aspect ratios of at least 100, 500, 1000, 5000 or higher relative to the foregoing fiber diameters. In one embodiment, the length of the polymeric fibers is dependent at least in part, on the length of time the device is rotated or oscillated and/or the amount of polymer fed into the system. For example, it is believed that the polymeric fibers may be formed having lengths of at least 0.5 micrometer, including lengths in the range of about 0.5 micrometers to 10 meters, or more. Additionally, the polymeric fibers may be cut to a desired length using any suitable instrument. Sizes and ranges intermediate to the recited lengths are also part of the inventive subject matter.

As used herein, the terms "fiber" and "filaments" may be used interchangeably, with the term "filament" generally referring to a category of "fiber" of high aspect ratio, e.g., a fiber of relatively long or continuous lengths that can be spooled around a desired object. Further, synthetic fibers are generally produced as long, continuous filaments. In contrast, "staple fibers" usually refers to natural fibers, which tend to be relatively short because that is how they are typically grown. Long synthetic filaments can be chopped into short staple fibers. In summation, a filament is a fiber, but a fiber can be in different lengths (staple or long or continuous).

In some embodiments, the polymeric fibers formed according to the methods of the inventive subject matter are further contacted with or exposed to an agent to reduce or increase the size of pores, or the number of pores, per surface unit area in the polymeric fibers. For example, various known chemical agents may be used, which are known to increase or decrease cross-linking in polymers or denature non-covalent linkages. Non-chemical agents may include heat and electromagnetic radiation.

The inventive subject matter is particularly suited for producing end-products having waterproof and breathable protection, as well as wind protection. Other nanofiber webs for waterproof and moisture breathability have been produced via electrospinning. Similar dimensions are believed possible by jet extrusion, but with greater fiber lengths than possible via electrospinning. The dimensions of these are 1000 nm or less. The webs are expected to have a range of fabric weights and weigh about 5 to about 25 g/m$^2$, with a thickness of about 10 to about 50 micrometers (See, e.g., Korean Patent Document No. 20090129063 A). For forcespun microporous membranes for waterproof/breathable applications, PTFE is an example of a suitable fiber-forming material. Suitable PTFE fiber diameters may range from about 100 nm to about 1000 nm. A range of thicknesses of webs is possible. A suitable thickness of the membrane thickness may be from about 7 micrometers to about 50 micrometers. A range of pore sizes in webs is possible. Suitable pore sizes for waterproof/breathable applications include about 250 nm or greater.

A wide variety of materials (synthetic, natural, bio-based-plants, bio-based-fermented) and fabric/substrate types (knits, wovens, and nonwovens) are contemplated for use in end products. Non-limiting examples of superfine fibers that may be created using methods and apparatuses as discussed herein include natural and synthetic polymers, polymer blends, and other fiber-forming materials. Polymers and other fiber-forming materials may include biomaterials (e.g., biodegradable and bioreabsorbable materials, plant-based biopolymers, bio-based fermented polymers), metals, metallic alloys, ceramics, composites and carbon superfine fibers. Non-limiting examples of specific superfine fibers made using methods and apparatuses as discussed herein include polytetrafluoroethlyene (PTFE) polypropylene (PP), polyurethanes (PU), Polylactic acid (PLA), nylon, bismuth, and beta-lactam superfine fibers.

Superfine fiber collections may include a blending of multiple materials, as indicated above. Superfine fibers may also include holes (e.g., lumen or multi-lumen) or pores. Multi-lumen superfine fibers may be achieved by designing, for example, one or more outlet ports with concentric openings. In certain embodiments, such openings may comprise split openings (i.e., an opening that possesses one or more dividers such that two or more smaller openings are made). Such features may be utilized to attain specific physical properties. For instance, the fibers may be produced for use as thermal insulation, or for use as elastic (resilience) or inelastic force attenuators.

In certain embodiments, fibrous webs of the present disclosure may include elastic fibers, such as elastane, polyurethane, and polyacrylate based polymers, to impart stretchability to the nonwoven textiles made according to the inventive subject matter.

Footwear Constructs

In certain embodiments, the inventive subject matter herein relates to an item of footwear that consists of an upper and/or sole unit. The functions generally provided by a sole unit, such as traction or cushioning, may be distributed across the sole unit in most any fashion—some areas of the sole unit may provide certain functions and other areas may provide other functions. Often a sole unit has multiple layers, with a midsole and outsole layers being common in athletic and outdoor footwear. The upper associated with a sole unit could be a complete enclosure that surrounds a foot or it could be a partial enclosure such as a set of sandal straps.

A sole unit, the upper, or the combination of the two may be broken down into a forefoot section, a midfoot section, and a rearfoot (or heel) section. The sole, the upper, or the combination of the two further includes a lateral half and a medial half.

As used herein, "footwear" refers to any item for supporting the foot and engaging the ground and encompasses shoes, sandals, boots, slippers, over shoes, athletic shoes, and other footwear articles. "Cushioning elements" refers to basic shock absorbing, energy return, and/or protective underfoot materials or structures that are intended to react to the forces of foot strike by providing force attenuation, dissipation, dampening, or energy return (spring), which are typically included on sports and athletic shoes. Traditionally, a cushioning element consists of a consistent and uniform layer of shock absorbing and protective material, such as such as EVA or polyurethane, placed in a shoe between the foot and the ground. However, in relatively recent years there has been trend towards customized placements of varying cushioning materials and structures under a foot. Nowadays, common cushioning elements may be based on EVA or polyurethane foam, visco-elastomers of foam or gels, fluid filled bladders, mechanical springs or resiliently collapsible mechanical structures, fluid (e.g., air) springs, or any combination of the foregoing.

For example polymer spring units have been placed in portions in the sole unit receiver, particularly the heel portion, and in some cases the forefoot portion. Mechanical polymer springs may be formed from an injected thermoplastic, such as Hytrel polymer, PEBAX, and TPU, as well as other resilient polymers, thermo-set plastics, and metallic materials known in the art, alone or in combination. See, for example, U.S. Pat. No. 5,461,800, which is hereby incorporated by reference in its entirety. The U.S. Pat. No. 5,461,800 discloses a foamless midsole unit, comprising upper and lower plates sandwiching transverse cylindrical units formed of resilient polymer See also, for example, U.S. Pat. Nos. 4,910,884, 6,625,905, and 5,337,492. Other forms of mechanical springs, such as leaf-spring structures are also contemplated.

A sole unit according to the inventive subject matter may include cushioning elements in accordance with any of the foregoing cushioning elements. Novel methods of forming sole units by forcespinning are discussed below. Contemplated traditional fabrication methods for the sole assembly and any associated cushioning elements include molding, injection molding, direct-injection molding, one-time molding, composite molding, insert molding, co-molding separate materials, or other techniques known in the art, alone or in combination. Contemplated fabrication or assembly methods include adhesives, bonding agents, welding, mechanical bonding, die cutting of molded or other materials, or interlocking shapes, alone or in combination. Laminated structures are within the scope of the present invention.

Dampening elements, which are a form of cushioning element (as defined herein), may also be incorporated into the sole units and/or sole unit receivers disclosed herein. "Dampening" generally refers to the ability of certain materials to reduce the amplitude of oscillations, vibrations, or waves. In footwear, shock from impact may generate compression waves or other vibrations within the sole system. Contemplated dampening materials include visco-elastomers. In some instances, plain elastomer materials may be used as dampeners; however, they may not provide as desirable dampening qualities on the spring unit as a visco-elastomer. Example materials for a visco-elastic dampener include any number of polymers, including polyurethanes and polyethylenes in foam or gel form, fabricated by conventional molding practices or by film. Other suitable visco-elastomers are known to persons skilled in the art.

Contemplated fabrication methods for visco-elastomers include molding, injection molding, direct-injection molding, one-time molding, composite molding, insert molding, co-molding separate materials, or other techniques known in the art, alone or in combination. Contemplated fabrication or assembly methods include adhesives, bonding agents, welding, mechanical bonding, or other mechanical or chemical fastening means know to persons in the art, alone or in combination. Laminated dampener structures are within the scope of the present invention.

The outsole or traction surface for a sole unit may include rubber, leather, cleats, spikes, studs, shanks of metal or other rigid material, felts, EVA, foam, and other cushioning technologies, and combinations of the foregoing. Most all the polymer materials usable in sole units may be forcespun or otherwise jet extruded according to the teachings herein.

The following discussion will focus on producing items of footwear having various features, such as the aforementioned ones, but the general principles discussed for forming footwear using forcespinning or other jet extrusion techniques may be applied to a variety of other manufactured objects.

Layered 3D Objects

Figure 5A:
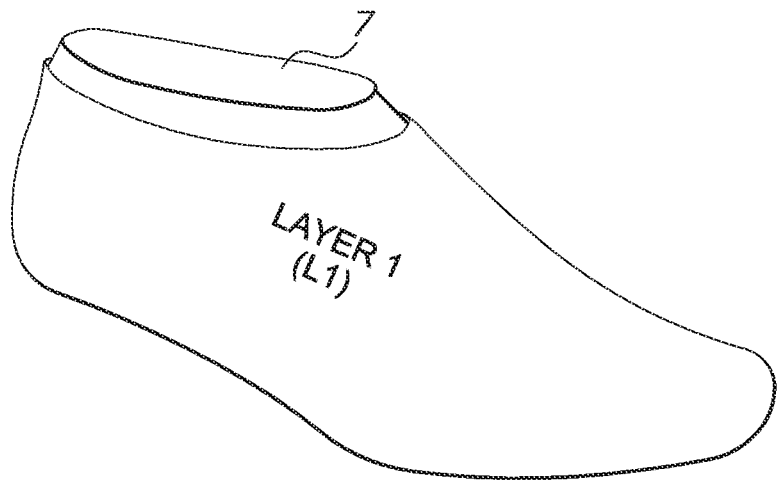
FIGS. 5A-5C schematically illustrate the use of a shoe last for collecting jet-extruded material.
Figure 5B:
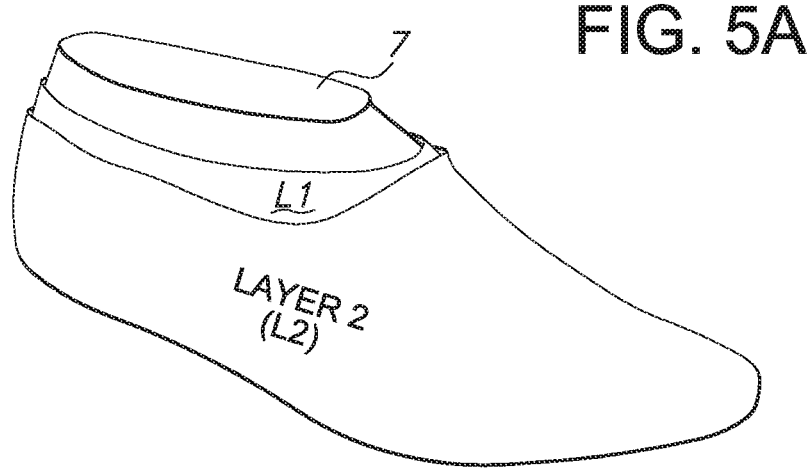
Figure 5C:
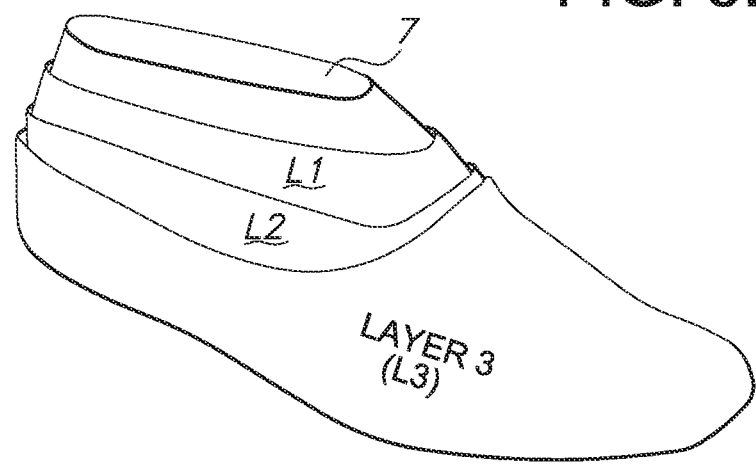

The inventive subject matter contemplates that in a multilayer construction, each layer can serve a different functional purpose. FIGS. 5A-5C show a shoe last 7 supporting multiple layers $L_1$-$L_3$ of material, each formed via jet extrusion process, such as forcespinning. The layers may have the same or different properties. For example, the first layer could be a comfort liner, the second layer could be a waterproof/breathable membrane layer, and the third layer could be a durable outer layer. Layering types are discussed in more detail below. Although three layers are shown, any given object may have more or less than three layers and each may correspond to any of the functionalities discussed below. Each layer type may be sequentially formed using forcespinning or other jet extrusion techniques described herein.

A comfort layer type provides comfort against a user's body surface. For example, a comfort layers could be a soft, pliable, nonabrasive material that is comfortable against a user's skin.

A moisture management layer facilitates transport of moisture away from a body or other substrate surface. For example, a moisture management layer could be a hydrophilic or absorptive material that wicks or otherwise transports moisture away from a user's body. Another option for moisture management is a fabric layer formed by jet extrusion and configured as a loose spacer mesh or with an array of voids, pockets, baffling or channels of airflow.

An antimicrobial layer type could be included as a separate layer or integrated with another layer. Silver or silver salts such as silver nitrate, or other silver-based compounds, are antimicrobial and could be incorporated in a textile layer in particle or fiber forms. Other antimicrobials may be based on copper or organosilanes, for example.

A waterproof/breathable membrane layer type, as discussed in detail above, selectively allows transport of water vapor from the body facing side of the membrane while blocking or significantly impeding liquid phase water from entering the opposite side of the membrane.

A thermal management layer type helps control heat retention or dissipation. For example, a bat of polyester fibers could help retain heat on one side of the bat for heat retention. The last may have a surface texture or structural pattern or overlay for forming recesses, voids, pockets, baffling, channels, etc. that have depth and form and are conducive to promoting air transfer for cooling or for trapping air for insulation. An overlay could be removed via techniques discussed below for other structural inserts. The layer may also have a density suitable for use as insulation.

A structural layer type helps provide durability, wear resistance, protective padding or structural elements to a multilayer construct. For example, the layer could be a material that is denser and tougher than other layers, providing durability, wear resistance and/or protection.

An electrical layer type embodies electronic features such as electronic elements e.g., conductors, microprocessors, memory, electronic devices, e.g., microprocessors, logic circuits, photovoltaic elements or devices, fiberoptic fibers, solidstate light emitters, etc.

An outer layer type is an outermost layer that may overlie one or more other layers. It may serve to provide durability and weather resistance or proofness. It may also support aesthetics and ornamentation, e.g., texture, graphics, color, and sculpture. Any of the aforementioned functional layers may be independent layers or a single layer that combines together functions into the single layer.

Last or other forms can be heated to cause fusing of jetted, fusible materials. The fusion can be across a given layer or to effect interbonding of different layers or inserted elements. Post-processing of material on a last or other form may include RF welding, compression of materials, chemical bonding of sections of the jet extruded material together or to added elements following jet extrusion (e.g., spraying a layer of adhesive on the jet extruded material post formation); milling of the jet extruded materials; thermal molding or bonding; stitching together of portions on the form or to elements added following jet extrusion; mechanical bonding of materials with mechanical fasteners, etc.

In some embodiments the different layers of material may be formed of materials that do not bond or adhere to together such that adjacent or adjoining layers are movable or separable relative to one another. Such layering could be localized to create, for example, pockets, flaps, or tongues. Areas on a mold or other form may be physically masked during the jet extrusion process to define localized features such as pockets, flaps, and tongues in an item once the masking object or material is removed. To maintain separation of layers, non-stick coatings may be applied over a first layer before jet extruding a second layer.

Integrated Structural Elements and Features

Various footwear components may be integrated into another component, e.g., an upper and/or sole unit, during a jet extrusion process. For example, looking at FIGS. 6A-6C, various structural elements or parts that may be integrated into an upper 22 or sole unit 24 include any one or more of a toe box 26, upper functional structure 27 (e.g., reinforcement bands), heel cup 28, heel counter 29, and orthotical and foot stabilizing elements, such as an arch support, lateral or medial stability structures, or shanks. These structural elements or parts could be placed into a force spinning or other jet extrusion apparatus and material may be forcespun onto them. They may also be formed in the same or different jet extrusion operation.

Figure 6A:
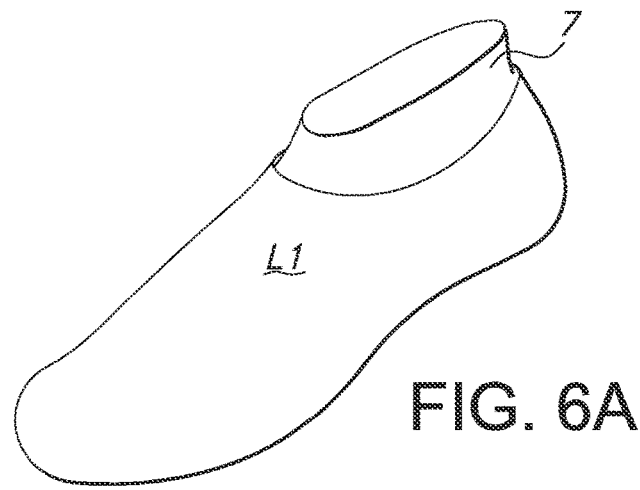
FIGS. 6A-6C schematically illustrate the use of a shoe last for collecting jet-extruded material, with structural elements integrated into the material.
Figure 6B:
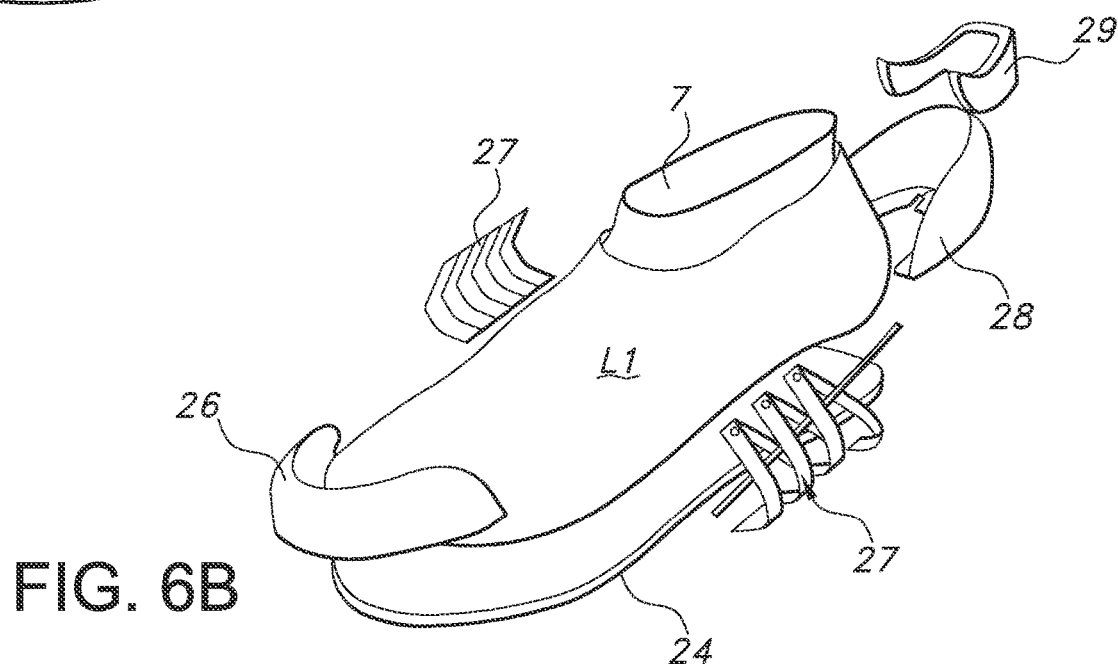
Figure 6C:
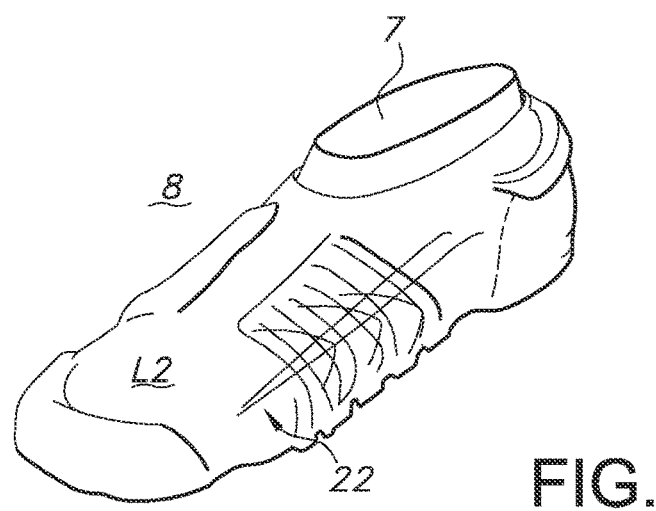

Structural elements and inserts may be placed on molds or forms and captured in, on, or between any given layer or layers of jetted material. For example, reinforcement webbing, lacing tubes, lacing or tensioning straps or harnesses lacing eyelets, heel counters, toe boxes, etc., could be captured by the jetted material. Some such examples are seen in the Figures. For example, FIGS. 6A-6C, show an example of structural layer $L_1$ formed on a last for forming a shoe upper. The last 7 includes a forefoot portion, a midfoot portion, and a rearfoot portion, as generally known in the art. Various structural elements may be disposed over layer $L_1$. A second layer of material is applied over the structural elements and some or all of layer $L_1$ to complete upper 22. The structural elements may be captured between the layers. The bottom side of the last can be associated with a sole unit 24 after formation of the upper on the last. (See also FIGS. 10A-10B).

Figure 7A:
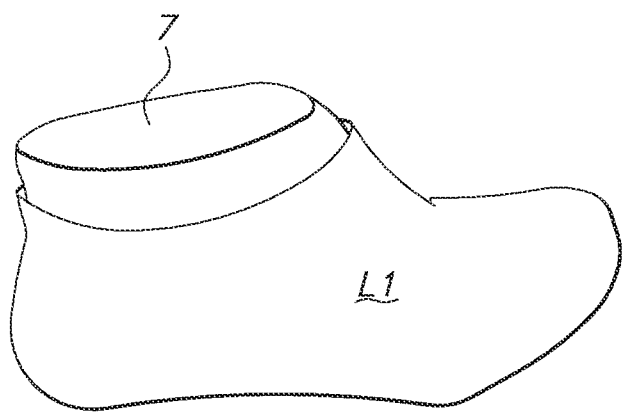
FIGS. 7A-7C schematically illustrate the use of a shoe last for collecting jet-extruded material to form an upper, with structural elements removably integrated into the material.
Figure 7B:
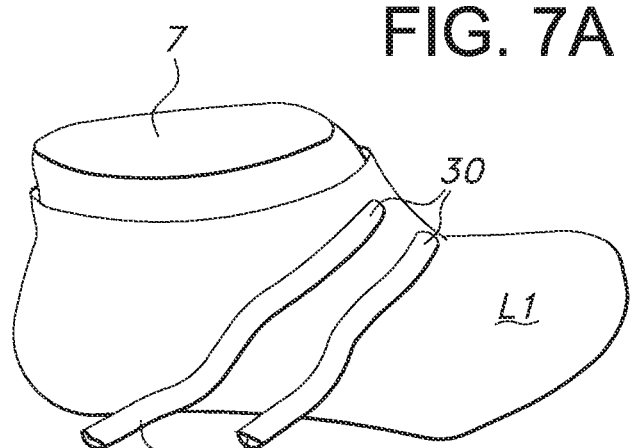
Figure 7C:
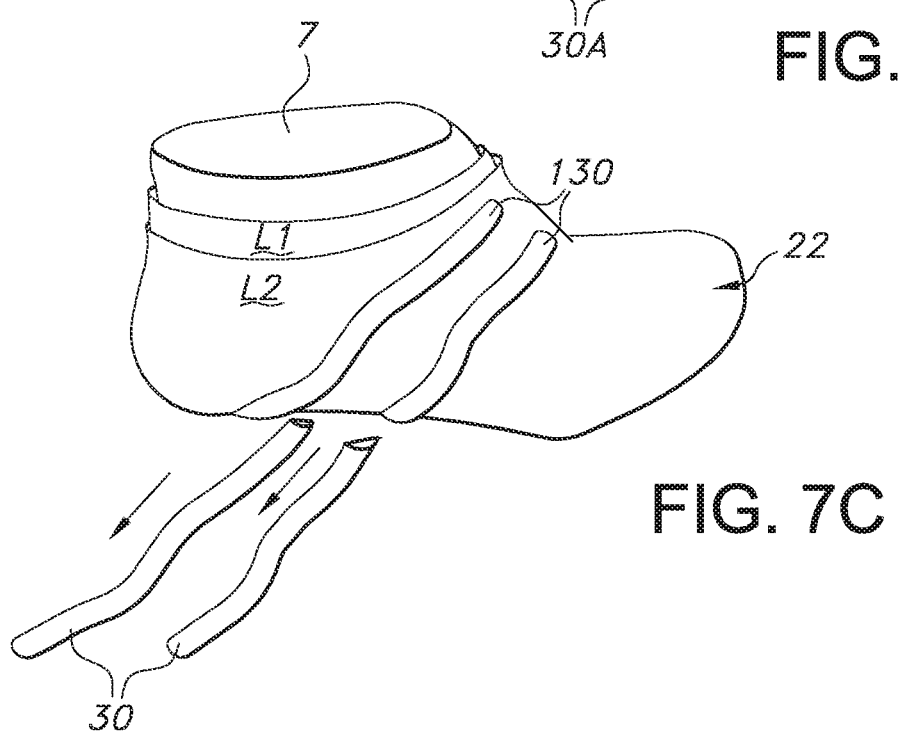

Looking at FIGS. 7A-7C, at least one layer $L_1$ of jet-extruded material is formed over tubes 30 placed on the last (or a layer of material already formed or otherwise disposed on the last). The tubes may be arranged in any desired orientation, e.g., transverse, generally vertical or perpendicular, or horizontal to the longitudinal axis of the last. Once a layer of material is formed over the tubes, the tubes may be removed, leaving channels 130 in the material. Alternatively, they may be left in place. For example, they could provide routing and sheathing for laces or tension cables.

If the tubes 30 are disposed over a first layer of material, the channels are fully enclosed. If the tubes are placed against a bare last, the channels have an open-ended side. Alternatively, the tubes can be left in place after a layer material is jet extruded over them. The channels or tubes can be used for housing and routing laces of reinforcements for an upper. The lacing channels can have traditional routing over tongue areas or extend along sides, under foot, and/or around heel areas. Notably, the channels or tubes can be arranged with any orientation on the upper and/or an associated sole unit. For example, they can route under the sole and up the upper to create a lacing or tensioning system that more completely surrounds a foot. Likewise, the channels or tubes can route around the heel area of an upper or around an ankle area of a high top or boot upper.

Fastening mechanisms such as male/female snap fasteners could be formed in the layer. In some cases, elements such as tubes or other forms can be removed after layers are formed to leave tubular or other voids in the layering for lacing systems or ventilation purposes or as cavities or spaces to receive another material or object after layer formation. For example, FIGS. 7A-7C show tubes 30 disposed over a last 7 or a layer of material $L_1$ disposed over the last. A layer of material $L_2$ is jetted over the assembly of tubes and last to form an upper 22, in whole or part. The tubes 30 may each have an extending portion 30A that can be grasped to remove the tubes after the upper is formed. The removal leaves a channel 130 in the upper material corresponding to the shape of the tubes.

Channels, voids, pockets, and other open spaces could also be formed in layering or between layers by placement of a dissolvable, meltable, washable, or volatilizable form on or in a last, mold, or other form. (Hereinafter, any such removable element, whether a discrete structure of defined layer of material, is simply referred to as a "dissolvable" element or material or the like). Dissolvable materials include salt compositions dissolvable in aqueous solutions, dissolvable wax or other organic forms dissolvable by, for example, heat (or irradiation, e.g., IR, UV, or ultrasound radiation) or organic solvent. Forms can have any desired shape. The dissolvable form could be solid volumetric forms such as cubes, cylinders, or complex forms, or more two-dimensional forms such as disks, webs, straps, thin tubes, filaments, particulates, etc. While the foregoing discussion relates to footwear, the same principles may be used to create forcespun or otherwise jet extruded constructs for apparel, backpacks, bags, sleeping bags, tents and a great range of other products.

Dissolvable Materials Used to Create Structural Features

The use of dissolvable forms can create mechanical features in an object being forcespun. To illustrate some possibilities, a first layer of material corresponding to a shoe quarter could be formed on a last or other form. Then a dissolvable material is placed along at least an edge of the first layer to mask the edge. A second layer of material corresponding to a vamp, which is to adjoin the quarter, is then formed over the edge portion of the composite of the first layer and the dissolvable material. When the dissolvable material is dissolved, the vamp and the quarter are not physically connected where the masking once was. Consequently, those portions are free to articulate relative to one another. FIG. 12B, discussed below, illustrates the foregoing concept of an articulating tongue 32 that may be defined in an upper using dissolvable materials.

Articulating Parts

Figure 8A:
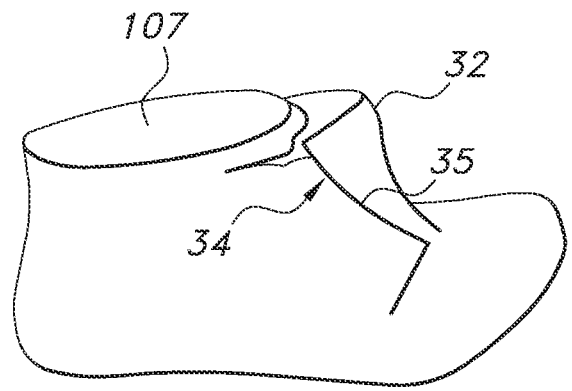
FIGS. 8A-8B schematically illustrate the use of a shoe last for collecting jet-extruded material to form an upper, with certain functional features integrated into the material.
Figure 8B:
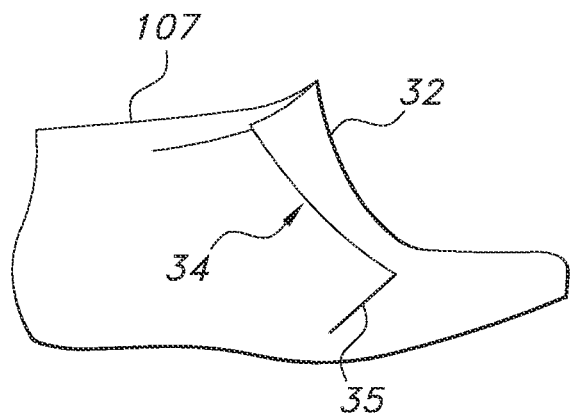

Forcespinning and other jet extrusion techniques can be used to create articulating parts in a unitary object. For example, a last or other mold could have cut lines or exploding sections built in or otherwise associated to create flex lines, living hinges, gussets, etc. For example, FIGS. 8A-8B show a shoe last 107 with contours for a gusseted tongue 35 that may be used a unitary upper structure made my jet extruding one or more layers of material over the last. Gussets 35 along each lateral edge of tongue allow for a tongue that is unitary with the body of the shoe upper but which can expand open to allow for easy entry or exit of the user's foot.

Figure 9:
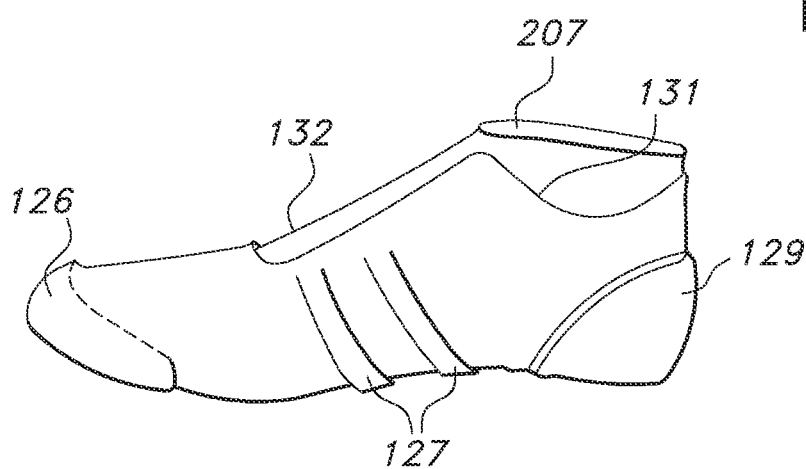
FIG. 9 schematically illustrate the use of a shoe last for collecting jet-extruded material to form an upper, with certain other functional features integrated into the material.
Figure 10A:
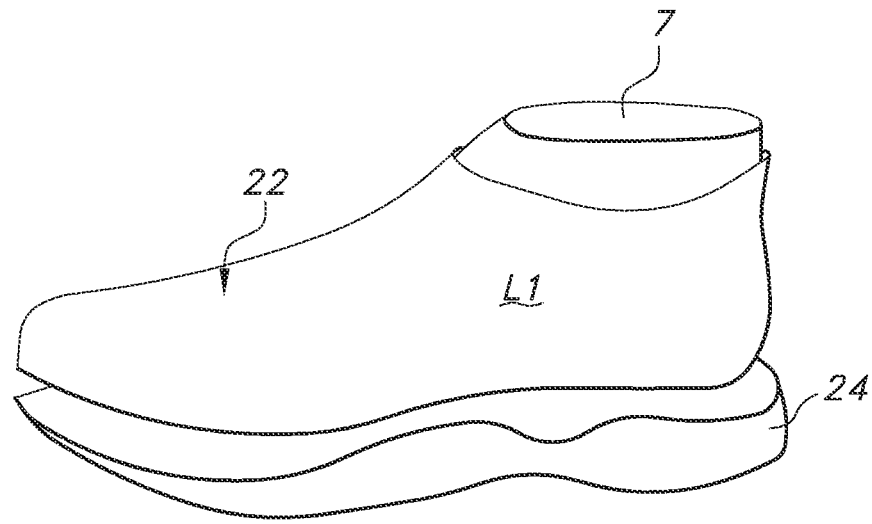
FIGS. 10A-10B schematically illustrate the use of a shoe last for collecting jet-extruded material to form an upper, with a sole unit being associated with an upper formed of the material.
Figure 10B:
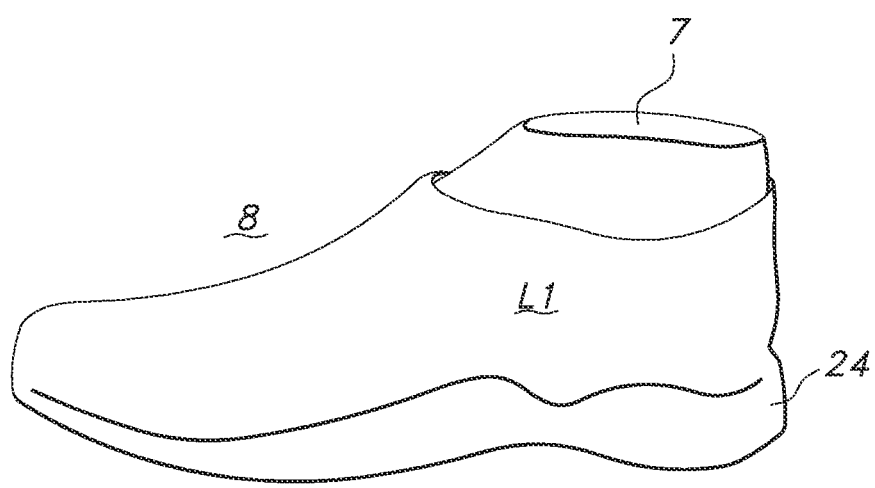

Looking at FIG. 9, last 207 has built-in shapes for a toe box 126, upper reinforcement structures 127, heel counter 129, and topline 131. As another example, the last could have an indentation 131 around its outer top perimeter so that forcespun material collects in the indentation to create a clean, structured topline. Similarly, the last could have a ridge around its outer top perimeter to create a corresponding structure in the material jetted onto the last. The ridge's outward wall and/or inward wall could be offset from the body of the last inwardly and/or outwardly to create top lines or cuff structures around the perimeter of the top of the upper. Other shapes may be formed on the last to correspond to other structures.

Sole Units and Sockliners

Standalone sole units and sockliners made using forcespinning or other jet extrusion method are possible using the inventive principles disclosed herein. FIG. 11A shows a mold 38 with a cavity 40 that corresponds to a sole unit configuration. FIG. 11B illustrates vertical or horizontal systems with an assembly 138 of multiple molds such as mold 30. FIG. 11C shows a horizontal arrangement of an array of multiple molds. A spinneret 12 can be associated with the molds such that material is ejected into the molds by rotation or other relative movement of the mold or mold assembly and/or the spinneret.

In some possible embodiments, the last or other mold includes or is associated with a cavity in the shape of a sole unit on its bottom for receiving jet-extruded material that forms a sole unit. FIG. 12 shows a fully-lasted upper 22 with a cavity on its bottom (not shown). Spinneret 12 is disposed below the cavity and ejects jet material 15 into the cavity to fill it and form a sockliner or other sole unit. The upper could be processed further. For example, FIG. 12B shows elevational and perspective views of upper 22. A layer of dissolvable material 42 could be applied to a shoe form in a desired pattern in one or more areas. In FIG. 12B, the material could be placed adjacent the intended edges of a tongue 32. When material 42 is dissolved, the edges are formed and the tongue is free.

As another example, dissolvable material could be placed to define a sole unit integration area (indicated by the cross-hatching in FIG. 12) in a lower portion of the upper or upper being formed. The area has a profile that corresponds to the upper edge profile of the sole unit 24 shown in FIG. 12C. The sole unit shown in FIG. 12C can then be applied over the assembly of upper and sockliner.

For any sole unit formed by jet extrusion, a tough polyurethane or thermoplastic polyurethane (TPU) fiber could be forcespun into the relevant cavity to form a sole unit. The sole unit may be formed in a plurality of layers to reflect midsole and outsole functions. Each layer may have a different material or different material properties. Forefoot, midfoot and rearfoot zones may have distinct properties by varying material types, thicknesses, densities, and structures. For example, a sole unit may have softer or firmer material on one side to account for support or anti-pronation functions. Forefoot and/or rearfoot zones may be formed of materials that provide higher traction. The discussion above related to sockliners applies to the construction of sole units too. For example, the sole units may be infused with polymer materials that cure to create an infused web that is durable, springy, cushiony and dampening.

Inserts, such as structural elements, may be placed in an outsole mold, just as can be done in any other mold for any object. For example, receptacles for sports or outdoor shoe cleats or spikes could be in the mold and the surround area filled in by a retaining forcespun or other jetted material. Or the actual cleat or spike could be in the mold. Other inserts for footwear, as indicated above, may include shanks, springs of metal or plastic, cushions or other force dissipation objects, microelectronics, such as force sensors, accelerometers, microprocessors, piezoelectric elements, batteries, capacitors, etc.

A sockliner has functional requirements similar to sole units and could be formed by jet extruding a supportive, cushiony material into an upper or onto the bottom of last or into a hollow last (discussed below). The material can be layered to have a density, porosity, sponginess, and/or springiness similar to conventional foamed polymers used in sockliners, such as EVA or PU foams.

Resilient, spring structures for sole units or sockliners could be formed in the layer for cushioning, force dampening or energy return. The layer could have viscoelastic properties for force dissipation and dampening. Such spring or force dissipation features would be useful in footwear or protective elements (e.g., standalone or garment-integrated knee, elbow or shoulder protectors).

Sole units may also be forcespun otherwise jet extruded using tuned layering so that different layers have different densities and provide a multi-density midsole or sockliner. Sole units may also be forcespun otherwise jet extruded using tuned zoning so that there is high to low rebound from front to back of sole unit or sockliner.

Webs with Infused Materials

In some embodiments, a porous or spongy structure is jet extruded with an open porosity that allows infiltration or insertion of other materials that will be used to tune the overall material properties of the structure. (Hereinafter, material that is in any way captured or otherwise infiltrated in a generally uniform distribution through the porous network of a forcespun or other jet-extruded web may be referred to as "infused" material and the processed web an "infused web".) Tunable attributes in an infused web include cushioning, stiffness, thermal insulation, abrasion resistance, texture, tactility, flame retardancy, waterproofness, moisture transport, color, and other properties of interest.

In some possible embodiments, a forcespun web of material has a textile or 3D spacer mesh structure that is infused with a polymer material that has a rubbery, plastic, foam, or spongy consistency. For example, a porous web having the nature of a 3D spacer mesh could be forcespun. Such a web could be formed by controlling forcespinning conditions so that a relatively high diameter fiber is jetted and collected as a low-density web. An infusible material such as a urethane material could be added to the porous, fibrous structure to create an overall fibrous, foam structure with resilience, energy return and dampening. In addition to liquid infusibles, nanoparticles or any other suitable particles could be blown in, sprayed in, or poured into the web during formation or after forcespinning of any object, and such processed webs shall also be considered "infused webs"). Particles include diatomite, perlite, plastics and rubbers, sand, ceramics, metals, and cellulosics and other biomaterials.

Forcespun or other jet extruded sheet material could also have infused materials for use as sheet stock that can be die cut or otherwise formed into particular objects. For example, not only can sockliners having an infused, web construction be formed directly from a forcespinning process.

Advanced Fabrication and Molding System for Footwear

Figure 13:
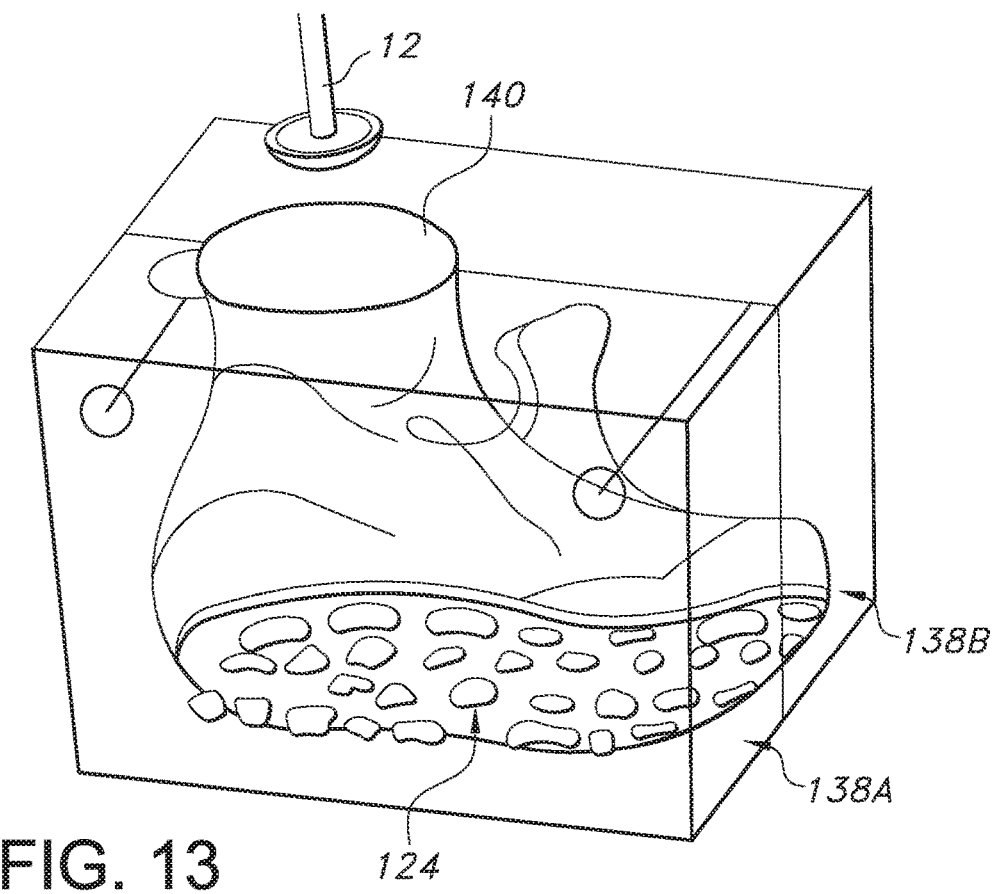
FIG. 13 schematically illustrates a single mold for forming an integrated upper and sole unit via jet extrusion of material into the mold.
Figure 14:
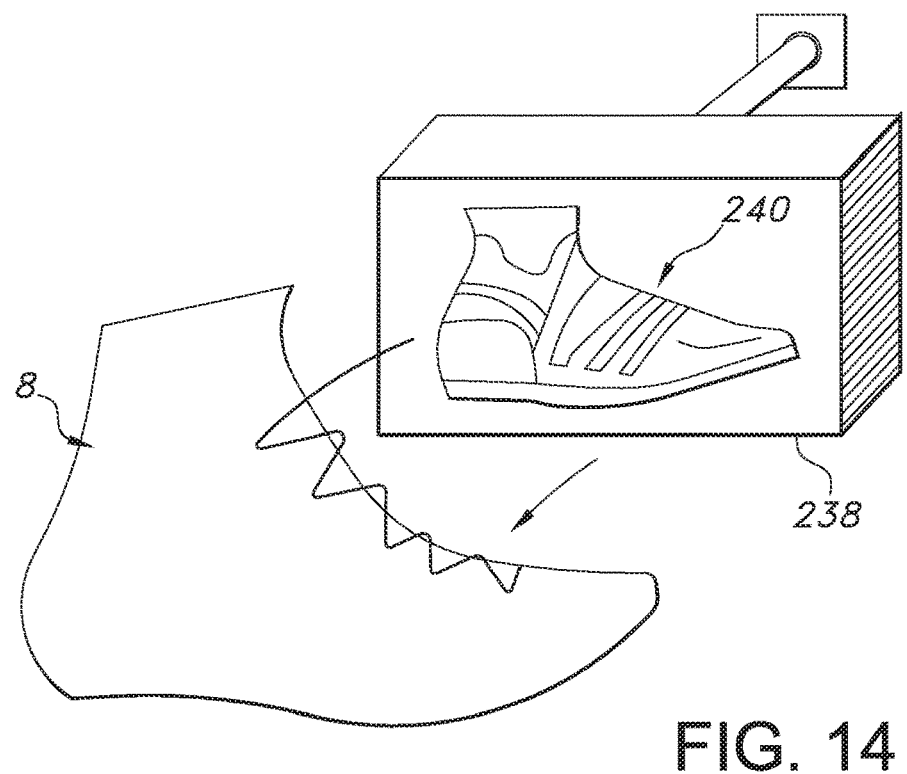
FIG. 14 schematically illustrates a mold for embossing or forming a pattern on a shoe formed in whole or party by jet extrusion.

FIGS. 13-14 illustrate a forcespinning and mold system where essentially an entire shoe can be fabricated in an automated fabrication process without any appreciable manual labor. In the system, a mold is provided that has separable halves 138A, 138B. The volume 140 in the mold represents an item of footwear. Part of the volume represents an upper shape 122 and another part represents a sole unit shape 124. A spinneret 12 jets one or more layers of the same or different material into the mold to coat the inner surface. The mini-spinneret is small enough that it can access internal voids or other selected areas in a mold and deliver a desired application of material on the mold or form surface. The mini-spinneret may be movable so that it may be moved to desired areas of a mold or other form, as discussed in more detail below. The mold includes a cavity for a sole unit. The sole unit could be first formed by forcespinning before the layering of the upper or after. In combination with selective movement of the spinneret, the jetted material may be varied to achieve selective application of material in the mold cavity, e.g., upper material in the upper area and sole unit material in the sole unit area.

Figure 15A:
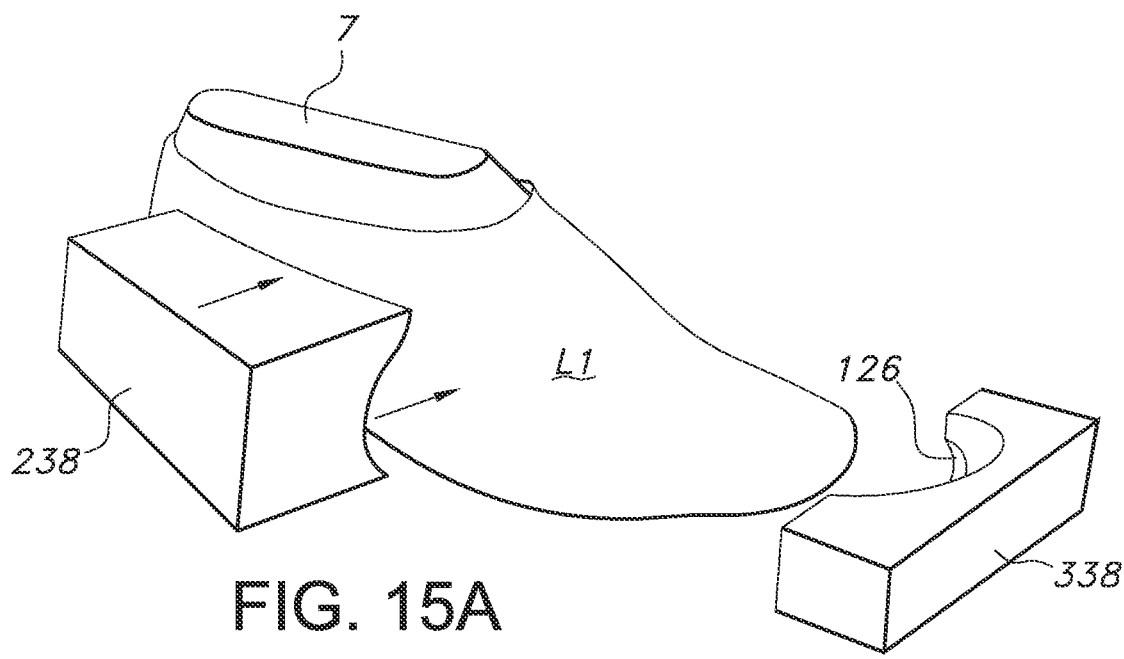
FIGS. 15A-15B schematically illustrates molds for embossing or forming a pattern on a shoe formed in whole or party by jet extrusion.
Figure 15B:
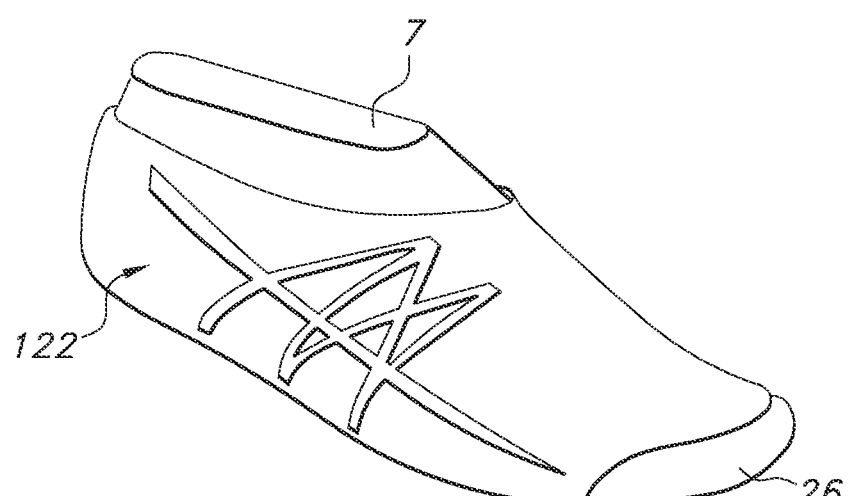

Referring to FIG. 14, an embossing mold may be used to emboss an item of footwear 8 or component thereof with a detail configured into the void 240 of a mold 238. FIG. 15A shows a similar arrangement for detailing or forming features in a construct of footwear. In this case, it is a last 7 with at least one layer $L_1$ of material disposed over the last. Mold 238 details a side of the construct. Mold 338 has a shape of a toe box and forms the toe area of the layer with a corresponding toe box. FIG. 15B shows the finished upper with certain details formed by the molds.

Any of the constructs formed by jet extrusion can be heated to bond, adhere or congeal materials together. The mold or form may be heatable to provide the needed heat.

In another embodiment of an advance fabrication process, multiple molds are loaded into single forcespinning chamber for simultaneous production of multiple elements.

The force spinning chambers for use in any of the embodiments of the inventive subject matter may include an array of nozzles for introducing any number of compositions before, during, or after forcespinning steps. For example, lubricants, dyes, colorants, adhesives, waterproofing, flame retardants, fabric softeners, etc. could be introduced by one or more spray nozzles to coat or treat a forcespun construct in a chamber.

Referring to FIGS. 16-20, lasts 7, 107, 207, molds, forms, or other objects in a forcespinning chamber may be arranged relative to a spinneret 112 or on an apparatus 113 configured for relative movement of the object along X, Y, and/or Z axes and/or to rotate the object around any one or more of such axes. By providing for such movement, the forcespinning can preferentially apply material to desired areas of an object. This can be in combination with selective control over the jetting of material. For example, the jetted material can be applied more heavily on certain areas or it can be applied in burst to avoid certain areas. In addition to movement of the object, the spinneret(s) used in a forcespinning can be arranged to move relative to an object along any one or more desired axes. The spinnerets may be position in spaced relation around a chamber for selective targeting of an object, e.g., top, bottom, front, rear, and/or side positions. Each spinneret can be separately configured with, for example, desired nozzles or to jet a different materials or to selectively turn on and off, as desired. As an example, a last or mold for a shoe could be placed in a chamber so that during an outsole formation process the topside corresponding to an upper faces a spinneret. Once the upper is formed, the mold or last could rotate so that the spinneret faces the bottom, sole unit side. The spinneret can then jet sole unit material(s) on the mold or last. Similarly, the mold or last could be stationary and have a top side facing a first spinneret for jetting upper material(s) and a bottom side facing second spinneret for jetting sole unit material(s).

Figure 21:
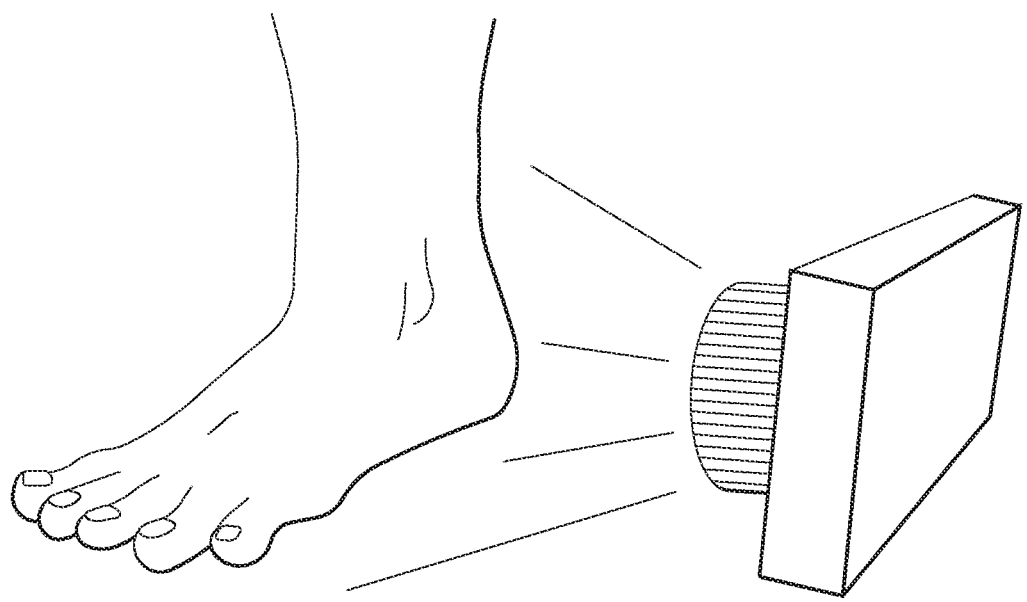
FIG. 21 schematically illustrates a foot scanner for scanning a foot for use in customizing footwear for a user.
Figure 22:
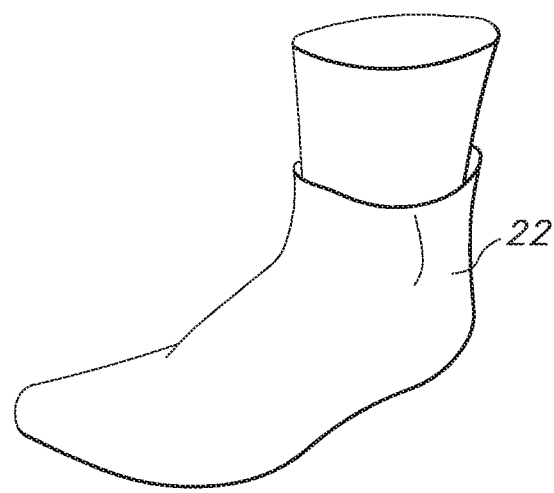
FIG. 22 schematically illustrates a customized item of footwear made using a foot scan taken from the scanner of FIG. 22.

A robotic arm associated with spinneret 112 and/or apparatus 113 may be used to effect any contemplated movement of lasts or other forms and/or spinnerets. FIG. 18A indicates how the foregoing processes and systems can be used to deposit multiple layers $L_1$, $L_2$, $L_3$, $L_4$, and $L_5$ on a last. $L_1$ could be a comfort liner for against the foot. $L_2$ could be an insulation layer. $L_3$ could be a waterproof/breathable membrane layer. $L_4$ could be a reinforcement layer. And $L_5$ could be a durable outer layer. FIG. 19 illustrates a resizeable last 107 on a multi-axis moveable apparatus 113, which may be used with a moveable or non-moveable spinneret (not shown). FIG. 20 illustrates a custom last 207 corresponding to a scan of an intended user's foot. FIGS. 21-22 illustrates a scanner for scanning a user's foot for making such a last.

Shape Memory Constructs Shape memory constructs can be made using forcespinning and other jet extrusion techniques. The constructs may be have functional properties based on the attributes of the base polymer materials and the characteristics of the web formed. Shape polymer materials are known. For example, shape memory polymers suitable for use in clothing and footwear are disclosed in US 20120000251, which is hereby incorporated by reference in its entirety. Some relevant disclosure from the '251 applications follows.

Shape memory polymers differ from conventional polymers because they have a physically crosslinked or chemically crosslinked structure to support the shape memory polymers at a high temperature, and a thermal transition temperature at a low temperature such as around or above ambient temperature acting as a shape switch. After deforming shape memory polymers, they are able to restore to their original shape upon heating above the thermal transition temperature. The shape switch can either be a glass transition ($T_g$) or a melting transition ($T_m$) temperature. According to thermal transition types used as the thermal transition temperature, shape memory polymers fall into $T_m$ type shape memory polymers and $T_g$ type shape memory polymers.

Shape memory fibers can sense the environmental temperature and respond to the temperature variation by shape variation. This enables the creation of intelligent garments and accessories with self-regulating structures and performance in response to environmental and human body temperature. Therefore, shape memory fibers may be used in different kinds of garments and accessories to enable smart wearing functionality. The shape memory garments and accessories with smart wearing functionality include: low-pressure shape memory undergarments and accessories, high-pressure shape memory garments and accessories, and shape memory garments and accessories with dynamic aesthetic design.

Shape memory fibers are made of shape memory polymers. The shape memory fibers are used to prepare textiles for garments, footwear, equipment and any other application of textile. The following description will illustrate the properties of shape memory polymers by reference to garments, but the inventive subject matter's approach of forcespinning shape memory materials into webs and objects is not limited to garments.

Low-Pressure Shape Memory Constructs

Garments made of shape memory fibers can improve the comfort sensation of textile products. This can be attributed to the fixity of shape memory fibers to temporary shapes, which diminishes most of the pressure sensation to wearers. The undergarments and accessories made of shape memory fibers with a human body thermal transition temperature become soft and flexible to adapt to the profile of the wearer. For example, the socks tops made of shape memory fibers can give a comfort sensation no indentation marks are produced on the skin of the leg. The waistbands made of shape memory fibers and yarns can adjust their length according to the variation of the waist of the wearer. The low-pressure garments and accessories made of shape memory fibers will not have any influence on the blood circulation of the human body as those products made of elastic fibers or threads.

The fabrics made of shape memory fibers have relative low vertical tension exerting on the skin compared to fabrics made of elastic fibers (spandex fibers) and other fibers in vertical pressure tests. In contrast, the garments and accessories made of elastic fibers (threads) exert significant pressure on the wearer because elastic fibers do not have shape fixity. The fabrics made of shape memory fibers can therefore improve the comfort sensation of textile products especially for undergarments and accessories such as intimate apparel, socks, waistbands, stocking, hosiery, pants, and legging, which are in close contact with the skin of the wearer.

The switch temperature of shape memory fibers for low-pressure garments and accessories is in the range of 5 to 30° C., and the breaking elongation is in the range of 50 to 600%. The shape fixity of the shape memory fibers is in the range of 10 to 50%, and the shape recovery above 90% tested by thermal drawing and thermal recovery. The shape memory fibers for low-pressure shape memory garments and other constructs also have a certain degree of elasticity with a recovery ratio of above 20% by cold drawing and cold recovery. Therefore the low-pressure garments can fit well to the profile of human bodies. The low-pressure shape memory garment and with comfort sensation may be made solely from shape memory fibers or in blends of the shape memory fibers with natural or synthetic fibers.

High-Pressure Shape Memory Constructs

Shape memory webs for high-pressure garments and other constructs are subjected to drawing. The drawing temperature is in the range of 20 to 150° C. with a drawing ratio 0.5 to 5.0. The high-pressure garments and other objects made of the shape memory, after being heated, can shrink to a shape with a very small size, which is referred to as a stabilized shape. By heating, the high-pressure garments and other objects can be softened and enlarged into a larger size than that of the wearer's body or other object to which the high-pressure shape memory construct is applied to. The enlarged shape can be temporarily fixed by cooling the garment or other construct to a low temperature. Therefore, the high-pressure garments and other constructs are easy to wear or fit. Then, by heating, the pressure garments and other constructs have a tendency to shrink and recover to their stabilized shape. Therefore, the pressure garments and other constructs can fit well for the wearer or other applied object and exert suitable pressure on the skin or other object. The high-pressure garments and constructs can also be easily removed from the wearer or object by heating them using, for example, a hair drier or hot water after which they become soft again. The high-pressure shape memory garments and other constructs can be repeatedly used.

The pressure garments and other constructs are fabricated by forcespinning shape memory fibers alone or with ordinary fibers, which may be jetted from a separate nozzle in the forcespinning apparatus. The pre-drawing and structure of the web in whatever form, e.g., a textile sheet or garment, determines the original initial size of the garment or other construct. A minimal size of the garment can be obtained by heating the garment or other object, for example, in hot water or by using a hair dry by free shrinkage. The size of the wearer's body part or other applied object should be in the range from about the original initial size to the minimal size. Through proper shape memory polymer selection, pre-drawing and garment and other construct structure design, selectively adjustable pressure can be exerted on the wearer or other applied object.

The thermal transition temperature of the shape memory fiber for high-pressure shape memory garments and other constructs may be in the range of 20 to 60° C. The shape memory fiber has a shape fixity ratio in the range of 30 to 100%, the shape recovery ratio in the range of 75 to 100%, tested by thermal drawing and thermal recovery. The breaking elongation ratio of the shape memory fiber should be in the range of 20 to 500%. The following are representative parameters and the inventive subject matter is not necessarily limited to those. The high-pressure garments or accessories include pressure socks, stocking, legging, and other pressure garments but not limited to these.

Shape Memory Constructs with Dynamic Design

Shape memory fibers, yarns and fabrics can be used for aesthetic or functional design. In comparison with shape memory metallic alloy wires for dynamic aesthetic design, shape memory polymeric fibers can give the look and feeling similar to conventional clothing fabrics, for example; and have better compatibility with human bodies. Furthermore, shape memory fibers are much cheaper compared to shape memory metallic alloy wires. Shape memory fabrics have better capabilities for 3D textiles than spandex and polyester fiber due to their good shape fixity.

For example, in shape memory fabrics, the shape memory fibers can be spaciously and loosely formed into a non-woven textile web so as to provide enough room for the shape memory effect to occur. Contraction (shape recovery) occurs when the environmental temperature increases. Therefore, fabrics with shape memory fibers can show dynamic functional or aesthetic design due to varying temperature. A number of functional or aesthetic design features can be achieved by using shape memory fabrics. For example, thermal expansion can allow for better venting of fabrics. A more open web may also change the texture and aesthetic attributes of a garment.

For shape memory garments and other constructs with dynamic design, different kinds of shape memory fibers are used depending on the desired effect. The dynamic design may be dynamic creasing recovery or style changing but not limited to these. For dynamic creasing recovery garments and other constructs, the shape memory fixity of the shape memory fibers should be above 95% and shape recovery above 90% tested by thermal drawing and thermal recovery. As suitable drawing parameters, the pre-draw ratio is in the range of 0.5 to 5.0. The treatment temperature of the process is in the range of 20 to 150° C. The shape recovery ratio of the shape memory fibers obtained is in the range of 70 to 100%; and shape fixity in the range of 70 to 100%, tested by thermal drawing and thermal recovery. The thermal transition temperature of the shape memory fibers for dynamic aesthetic design is in the range of 20 to 65° C. As elsewhere, the foregoing parameters are illustrative and the inventive subject matter is not necessarily limited by them.

The shape memory fibers for achieving the functions described may be made of shape memory polyurethanes. The shape memory polyurethanes may be synthesized from three starting materials: long chain polyol, diisocyanate, and chain extender. Diisocyanate and chain extender form the hard segment and the long chain polyol forms the soft segment.

Depending on the desired properties on the shape memory garments and other constructs, the shape memory polyurethanes used to fabricate shape memory fibers are two types: $T_m$ type shape memory polyurethane and $T_g$ type shape memory polyurethane. The polyols for $T_g$ type shape memory polyurethanes are tabulated in Table 1. The polyols for $T_m$ type shape memory polyurethanes are tabulated in Table 2. The diisocyanate for the shape memory polyurethanes are shown in Table 3. The molecular extenders for the shape memory polyurethanes are presented in Table 4. Alternatively, the chemicals may be a mixture of polyols, co-polyols, mixed diisocyanate, modified diisocyanate or mixed molecular extenders.

TABLE 1

Polyols for $T_g$ type shape memory polyurethane

| Polyol | Molecular weight (Mn) |
| --- | --- |
| Polypropylene glycol (Mn:) | 250~650 |
| Polytetramethylene glycol | 250~650 |
| Polyethylene glycol | 250~650 |
| Poly (1,6-hexylene adipate) diol | 250~650 |
| Poly (1,4-butylene adipate) diol | 250~650 |
| Poly (ethylene adipate) diol | 250~650 |
| Poly (1,2-propylene adipate) diol | 250~650 |
| Polycaprolactone diol | 250~650 |
| Polycarbonate diol | 250~650 |
| Bisphenol A + propylene oxide | 300~800 |
| Bisphenol A + ethlene oxide | 300~800 |

TABLE 2

Polyols for $T_m$ type shape mempry polyurethanes

| Polyol | Molecular Weight (Mn) |
| --- | --- |
| Poly (1,6-hexylene adipate)diol | Mn: >3000 |
| Poly (1,4-butylene adipate)diol | Mn: >3500 |
| Polycaprolactone diol | Mn: >3500 |

TABLE 3

Diisocyanate for shape memory polyurethanes

| Diisocyanate | Molecular weight (Mn) |
| --- | --- |
| isophorone diisocyanate | 222 |
| methylene-bis(4-cyclohexylisocyanate) | 262 |
| 1,6-hexamethylene diisocyanate | 168 |
| 4,4'-diphenylemethane diisocyanate | 250 |
| 2,4-tolulene diisocyanate | 174 |
| tetramethylxylene diisocyanate | 244 |
| 1,4-Phenylene diisocyanate | 160 |

TABLE 4

Molecular extenders for shape memory polyurethanes

| Molecular extenders | Molecular weight (Mn) |
| --- | --- |
| 1,3-propandiol | 76 |
| 1,4-butanediol | 90 |
| 1,2-ethanediol | 62 |
| 1,6-Hexanediol | 118 |
| 4,4'-dihydroxy biphenyl | 186 |
| 2,2-bis(hydroxymethyl)propionic acid | 134 |
| hydroquinone bis(2-hydroxyethyl)ether | 198 |
| 4,4'-bis(2-hydroxyethoxy)biphenyl | 274 |
| 4,4'-bis(6-hydroxyhexoxy)biphenyl | 414 |
| Bis(p-hydroxymethyphenyl)terephthalate | 378 |
| 4,4'-(1,4-phenylene bis(methylldynenltrilo))diphenylethanol | 372 |
| bisphenol A. | 228 |
| N-bis(2-hydroxyethyl)-isonicotinamide | 210 |
| N-methyldiethanolamine | 119 |
| bisphenol A ethoxylate | 404 |
| 1,2-diamninoethane | 60 |
| 1,2-diaminopropane | 74 |
| polyhedral oligomeric silsesquioxanes | 1017 |
| N,N-dis(2-hydroxyethyl)-isonicotinamide | 210 |
| N-methyldiethanolamine | 119 |

The shape memory polyurethane may be synthesized by bulk polymerization or solution polymerization. In bulk polymerization process, a one-step polymerization or a two-step polymer method can be used. In a one-step polymerization process, all the chemicals are added to the reactor at the same time. In a two-step polymerization process, the polyol is first end caped with isocyanate moieties at both ends; and then extended with small sized diols or diamines. In solution polymerization, solvent is used during the synthesis. Suitable solvents can be selected from the group consisting of N,N-dimethylformamide, Dimethylformamide, N,N-dimethylacetamide, 1-methyl-2-pyrrolidinane, methyl sulfoxide or mixture thereof.

The shape memory polyurethanes are then processed to produce shape memory fibers. According to the inventive subject matter, spinning techniques are forcespinning or any other jet extrusion technique disclosed or contemplated herein.

In wet spinning, the solid concentration of shape memory polyurethane is adjusted to 20 to 40 wt % and viscosity of 5 to about 200 Pa·S. The spinning solution is heated and maintained at a certain temperature if necessary. The shape memory fiber is extruded out from a spinneret and precipitated in a coagulation bath. Then, the shape memory web is subjected to heat treatment and post drawing, if necessary.

In dry spinning, the solid concentration of shape memory polyurethane is in the range of 25 to 40 wt %. The polymer solution is extruded through a spinneret. Hot air may be used to evaporate the solvent.

In melt spinning, the shape memory polymer is melted and extruded though a fiber spinneret and solidified by cooling. The shape memory fibers may also be prepared via multi-component spinning for more special properties. In multi-component spinning, two or more polymer melts may be used, at least one of which may be a shape memory polyurethane. The shape memory fibers prepared can be in the form of cylindrical fibers, hollow fibers, or any abnormal fibers.

U.S. Pat. No. 8,726,414, which is hereby incorporated by reference in its entirety, discloses articles of apparel that include zones with a textile having a structure that changes or is otherwise modified by a physical stimulus, such as the presence of water or a temperature change, to modify a property of the textile. The zones may be along a center back area and side areas of the apparel, and the textile may increase in air permeability when exposed to water. The zones may also be in an upper area of the torso and in a lower back area, and the textile may increase in texture when exposed to water. In some embodiments, slits are formed in the textile. The functional changes may be achieved using a shape memory polymer, and the disclosed apparel may be formed via forcespinning of shape memory polymers. Similarly, U.S. Pat. No. 8,187,984, which is hereby incorporated by reference, discloses a textile fabric includes a smooth surface with one or more regions having coating material exhibiting thermal expansion or contraction in response to change in temperature, adjusting insulation performance of the textile fabric in response to ambient conditions. The functional changes may be achieved using a shape memory polymer, and the disclosed fabric may be formed via forcespinning of shape memory polymers.

Adjustable Molds and Other Forms

The inventive subject matter contemplates forcespinnning and other jet extrusion processes on adjustable forms and molds. The use of adjustable forms, e.g., forms that change in size, shape, or which are modular, allows more efficient production of objects by reducing the number of different forms needed to produce a range of sizes or styles.

An adjustable last in the form of an expandable bladder 107 is shown in FIG. 16. By expanding or contracting the bladder, different size shoes or components, for example, can be made. The bladder can be selectively expandable so that there is anisotropic changes in size of the last along different axes and areas. The bladder can be made of a pressurizable elastomer, such as a natural or synthetic rubber, or other pressurizable and elastically expandable material or structure. Areas on or in the bladder may be selectively configured with materials that have different rates of expansion under pressure and allow desired patterns of expandability.

An expandable or otherwise adjustable last or other form or mold also allows customization of features to end user specifications, e.g., specifics of a given user's 3D-scanned foot. Adjustable lasts are well known in the shoe and other fabrication arts. The following are representative examples that may be adapted for use with forcespinning and other jet extrusion techniques disclosed herein. US 20130291317, which is hereby incorporated by reference in its entirety, discloses an adjustable last that may be inserted into an article includes provisions so that the position of an adjustable portion of the adjustable last can be changed according to the size of the article. In some embodiments, the adjustable last includes an inflatable member that can be filled with fluid according to the size of the article, and may be used to adjust the size of the article. Other embodiments do not include an inflatable member. The adjustable last can include an adjustment assembly for adjusting the adjustable portion. The adjustment assembly can include a wedge member that may moveable engage other last parts to vary size and shape.

U.S. Pat. No. 7,980,007, which is hereby incorporated by reference in its entirety, discloses a system for custom fitting athletic shoes to an individual wearer includes a foot measurement device, an adjustable foot form and an infrared activation chamber. Shoes of a single width for each length size have at least a portion of the upper made of heat malleable material to be custom fitted for width. Foot measurement data is used to calculate length size, width size and a number of custom adjustment factors. After the length size is calculated, the appropriately sized shoe and last are assembled together and subject to infrared radiation until the heat malleable material becomes plastic. Adjustments are then made to the last in accordance with the adjustment factors to provide custom width sizing. After further heat treatment to set the shoe upper and cooling, the shoe is complete. In this manner, if used in a retail setting, shoes are custom fitted to the wearer in a matter of minutes.

In addition to expandable lasts, lasts could be in the nature of vacuum formed shells. 3D printed lasts are also contemplated. They may be printed to the specific anatomy of a particular use or selected demographic group.

Finishing—Post Forcespinning Steps

Various steps may take place after forcespinning or other jet extrusion technique. For example, sheets or 3D constructs formed via forcespinning can be placed onto or into molds to give desired shapes. Material can be molded into set shapes by heat, pressure, UV curing of curable materials, coating with resins or other settable materials. For example, webs of thermoplastic materials can be heat molded to desired shapes. Web materials can be used as layups for forming composites materials and molded into desired shapes by treating the web with a settable resin. In this fashion, advanced composite materials can be formed without the disadvantages of weaving and all the advantages of forcespinning.

Resizing

In some embodiments, the inventive subject matter is directed to the formation of a single-size item that is expandable post-formation into multiple sizes. For example, an item of footwear e.g., an upper or full shoe with sole unit could be formed of a thermoplastic, thermosettable, or other thermoformable material. Once formed, it may be placed on an expandable or adjustable last or other mold that changes the item to a larger desired size. Thereby, a single sized item formed via forcespinning can be resized or reshaped to custom sized or shapes. In addition to molds, the resizing or reshaped can take place while on a user's foot or other applicable area of anatomy or a replicable of the anatomy, e.g., a last or mold based on scanning of user's anatomy and including full anatomical or select detail, not just a facsimile of a foot as in a conventional last.

Color variation in a construct can be achieved by varying the distance of the spinneret nozzle which will result in varying concentration or density of colored material, the closer to nozzle, more intense the spray and consequently the color, the farther, the more spread-out the spray and less intense the color. Similarly, different textures may be achieved by varying or using, for example, spinneret nozzle distance, nozzle apertures, duty cycles, sputtering. In addition, to jetting colored materials, a clear material could also be used as an outcoating on a forcespun layer.

Miscellaneous Finishing Steps

Other post-processing steps of webs may include cutting, trimming edge formation, dyeing, embossing, graphics printing, etc. To provide durability, relatively high abrasion material may be forcespun otherwise applied vulnerable product areas, e.g., around toe and/or heel in footwear.

The foregoing embodiments are not meant to be an exhaustive list of the methodologies used to create and capture continuous fibers from a forcespinning apparatus. From the teachings herein, persons skilled in the art may use forcespinning to produce and collect continuous fibers for any application in woven or knitted goods or any other application that uses continuous fibers.

Definitions (as Generally Described in Literature for the Outdoor and Textile Industries)

Waterproof/breathable (composite fabric): a textile (knit or woven) composite that withstands water penetration of a certain pressure as defined by different standards but it also breathable, as measured by different standards allowing moisture to pass through the composite material. The composite can contain 1 textile layer and the waterproof breathable membrane (defined as a 2 layer waterproof-breathable composite), or the waterproof-breathable membrane can be sandwiched between 2 textile layers (defined as a 3 layer waterproof-breathable composite). In the case of a 2.5 layer waterproof-breathable composite, the membrane typically has a print applied on the membrane surface opposite the outer textile side. This print can be a color, design, and/or include functional particles in any pattern. Textile layers can be woven or knitted structures of any fiber type (natural, synthetic, bio-based, biodegradable) or blends of any fiber types. All seams are sealed using seam tape to ensure waterproofness.

Waterproof/Breathable Membrane: A flexible material that is (1) waterproof, and (2) breathable to moisture, according selected standards. Membranes can be hydrophilic, hydrophobic, monolithic, or microporous. A bi-component membrane combines two layers, for example GORE-TEX ePTFE membranes and another layer of material.

Air Permeability: Ability of a textile, membrane, or composite to allow air to penetrate through the material; measured in CFM, cubic feet per minute.

Moisture Vapor Breathability/Vapor Permeability: Referred to the ability of a textile, waterproof/breathable membrane, or composite to allow moisture (liquid or water vapor) to pass through the material.

Hardshell (2L, 2.5L, 3L): A waterproof-breathable composite consisting of multiple layers 2, 2.5, or 3L that achieve a high degree of windproofness. The outer layer is typically a more material, such as a Nylon fabric. A typical fabric constriction is a ripstop.

Softshell: Textile composite with high water resistance, however, focusing on wind blocking. Wind block may be attained using a waterproof breathable membrane (sandwiched between two textile layers) or using an adhesive or glue to affix 2 textiles or substrates together. The glue is not air permeable and therefore meters air penetration in the composite. Textile fabrics are typically softer woven and knitted fabrics, hence the term softshell. By manipulating the design features for each textile composite, the air permeability can range from between 0 to 100% wind block.

Nanofiber: Defined as fibers with diameters between 100-1000 nanometers. Nanofibers provide high surface area and unique properties at the nanoscale level.

Nonwoven: fabric-like materials that are made from fibers bonded together by something other than a weaving process, such as chemical, heat, mechanical, or solvent processes. The fibers are entangled, creating a web structure. The entanglement creates pores between fibers, providing some degree of air permeability.

Persons skilled in the art will recognize that many modifications and variations are possible in the details, materials, and arrangements of the parts and actions which have been described and illustrated in order to explain the nature of the inventive subject matter, and that such modifications and variations do not depart from the spirit and scope of the teachings and claims contained therein.

All patent and non-patent literature cited herein is hereby incorporated by references in its entirety for all purposes.

What is claimed is:

1. A method of forming an article using jet extrusion, comprising:

disposing, on a 3D mold comprising at least in part a non-planar form or other form representing an article or component of footwear, an insert comprising a removable or dissolvable element;

streaming a first fiber-forming material from an outlet of a jet extrusion apparatus over the removable or dissolvable element of the 3D mold in whole or part until a first web of entangled fibers are disposed against the mold or other form in a first layer wherein the removable or dissolvable element has a shape that leaves a three-dimensional impression of a selected shape in at least the first web of entangled fibers following removal or dissolving; and further streaming the first fiber forming material or a second fiber forming material from the same or a different outlet until a second web of entangled fibers are disposed over or adjacent the first web of fibers in a second layer different from the first layer in terms of one or more of fiber-forming material, fiber diameters, fiber geometries, web porosities, web densities, or web thicknesses, and wherein fibers of the first web intersect or entangle with fibers of the second web as a result of the jet extrusion; and masking a selected part of the 3D mold and/or one or more of the first fiber forming material or a second fiber forming material on the mold or other form to create articulating parts.

2. The method of claim 1 wherein the first web serves as at least a section of an upper of the footwear and the second web serves as a section of sole unit.

3. The method of claim 1 wherein the mold or other form includes an insert comprising a structural component of the article that is to be integrated with the first or second web of entangled fibers following the jet extrusion and the method includes the step of streaming the fiber-forming material over the structural component or the element, in whole or part.

4. The method of claim 1 wherein a masking material used for the masking is removed or dissolved.

5. The method of claim 1 wherein a living hinge is formed via the removal or dissolving to allow for the movement of the parts.

6. The method of claim 1 wherein the different webs of entangled fibers are based on different selections from the group of a waterproof/breathable membrane layer type; a thermal management layer type; a structural layer; an electrical layer type; and an outer layer type.

7. The method of claim 1 wherein a third web different from each of the first and second webs of entangled fibers is formed by jet extrusion of fiber forming material over the first or second webs, each of which web is a different selection from the group of a waterproof/breathable membrane layer type; a thermal management layer type; a structural layer; an electrical layer type; and an outer layer type.

8. The method of claim 3 wherein the article comprises an upper for an item of footwear.

9. The method of claim 1 wherein the article comprises a sole unit comprising the first and second webs, the webs being adjoining rearfoot, midfoot, and/or forefoot zones of different material properties.

10. The method of claim 1 wherein the article comprises a sole unit wherein at least one web comprises a cushioning layer and the second web comprises an outsole layer disposed over the first web.

11. The method of claim 1 wherein the form comprises at least a peripheral edge of the article, and the edge is exposed to fibers formed during the jet extrusion process, allowing the fibers to collect on the edge and to extend from the edge as the first or second web, and bonding the collected fibers to the exposed edge to form an integral assembly of the edge with the first or second web.

12. The method of claim 1 wherein the first or second web comprises superfine fibers.

13. The method of claim 12 wherein the web of superfine fibers comprises a waterproof breathable membrane.

* * * * *